(12) United States Patent
Neil

(10) Patent No.: US 7,085,066 B2
(45) Date of Patent: Aug. 1, 2006

(54) ANAMORPHIC IMAGING SYSTEM

(75) Inventor: Iain A. Neil, Calabasas, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 10/923,289

(22) Filed: Aug. 20, 2004

(65) Prior Publication Data
US 2006/0050403 A1    Mar. 9, 2006

(51) Int. Cl.
G02B 13/08    (2006.01)
(52) U.S. Cl. ....................... 359/668; 359/710
(58) Field of Classification Search ........... 359/668, 359/670, 671, 710
See application file for complete search history.

(56) References Cited

U.S. PATENT DOCUMENTS

| | | | |
|---|---|---|---|
| 2,890,622 A | 6/1959 | Wallin | |
| 3,865,738 A | 2/1975 | Lente | |
| 2004/0196570 A1* | 10/2004 | Nurishi | 359/668 |

OTHER PUBLICATIONS

"The Proposed Trilent-35 System," by Miklos Lente, *American Cinematographer*, Jun. 1976 (4 pp).

"Three-Perf In The Future?," by Rune Ericson, *American Cinematographer*, Jul. 1986 (4 pp).
"A Universal Format For Film Production," by N. D. Bernstein et al, *Journal Of The SMPTE*, vol. 82, Sep. 1973 (3 pp).
"Shiga Rear Anamorph," *Lens Diagram And Optical Prescription* (2 pp), Dec. 1997.

* cited by examiner

*Primary Examiner*—Scott J. Sugarman
*Assistant Examiner*—Darryl J. Collins
(74) *Attorney, Agent, or Firm*—Morrison & Foerster LLP

(57) ABSTRACT

A rear anamorph is disclosed with at least two cylindrically surfaced elements oriented in one direction primarily for squeezing or stretching the image with a ratio of less than 2:1, and at least two cylindrically surfaced elements oriented in a second direction primarily for aberration control. The cylindrically surfaced elements oriented in one direction may be moved as a group along the optical axis, and the cylindrically surfaced elements oriented in the second direction may also be moved as a group along the optical axis. In addition, the entire rear anamorph may be moved together, and a lens unit attached to the rear anamorph may also be moved with respect to the rear anamorph. With these adjustments, the two image planes formed by the two focal lengths created by the cylindrically surfaced elements in the two directions may be aligned with each other and superimposed on the nominal image plane.

55 Claims, 12 Drawing Sheets

RAY ABERRATIONS (MILLIMETERS)

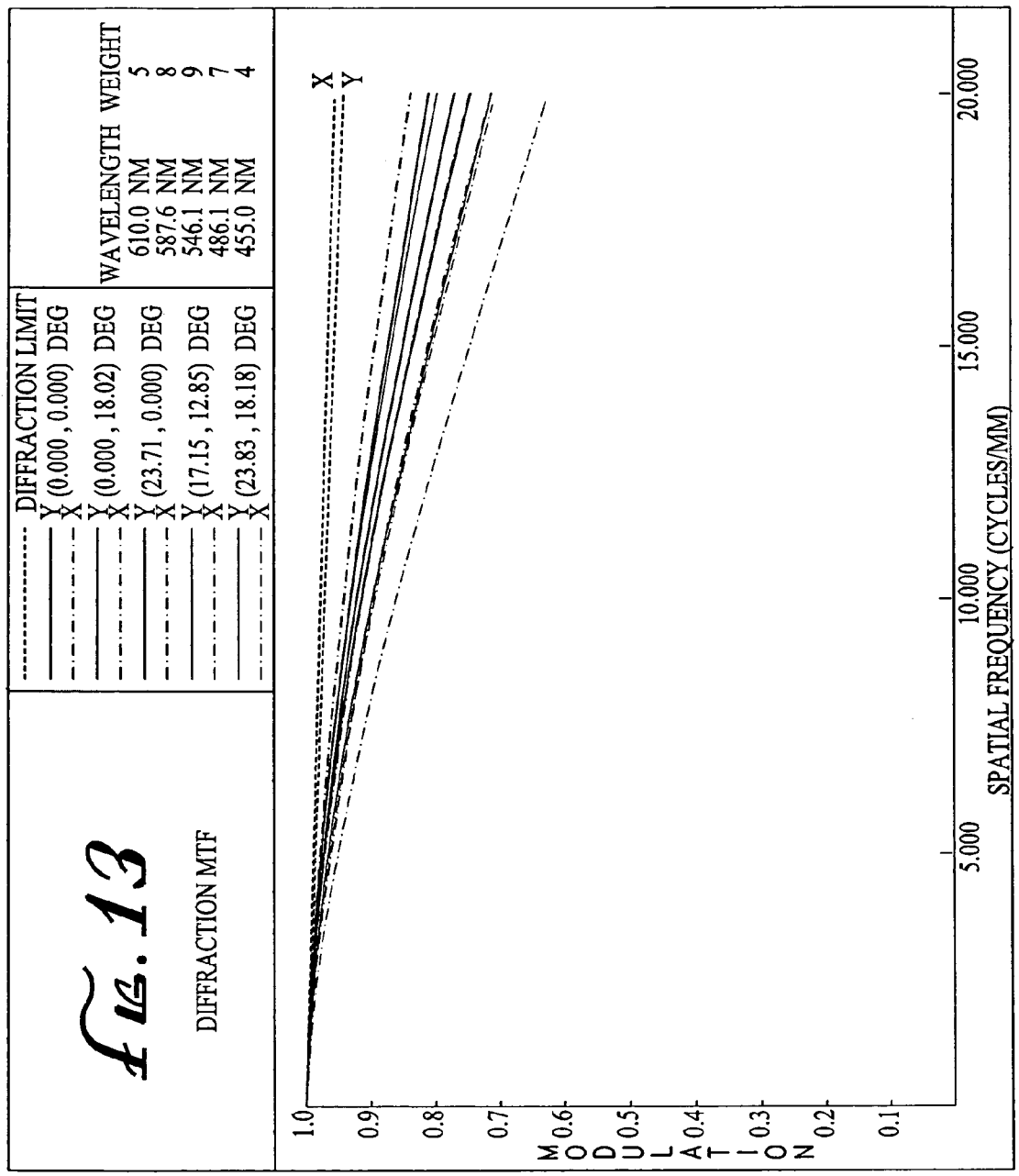

ANAMORPHIC IMAGING SYSTEM

CROSS-REFERENCE TO RELATED APPLICATIONS

This application is related to U.S. patent application Ser. No. 10/927,731, filed on Aug. 27, 2004 and entitled "Anamorphic Three-Perforation Imaging System," and to U.S. patent application Ser. No. 11/003,858, filed on Dec. 3, 2004, also entitled "Anamorphic Three-Perforation Imaging System," the contents of which are incorporated by reference herein.

BACKGROUND OF THE INVENTION

1. Field of the Invention

The present invention relates, generally, to anamorphic lenses, and in particular embodiments, to a rear anamorph that provides high image quality and is small enough in size to make it suitable for use with both prime and zoom lenses.

2. Description of Related Art

Conventional anamorphic formats. In the early 1950s, as a result of the perceived threat of television, motion pictures began to be released in various widescreen formats. Until this time the majority of feature films and television programs were released with frames having an aspect ratio of 1.33:1 (4:3).

To capture a widescreen image onto a standard-sized film frame, a special lens known as an anamorphic lens is used to horizontally squeeze (i.e. compress) a wide field of view down to the size of the standard film frame. Anamorphic lenses are essentially astigmatic; the magnification in the horizontal direction is different from the magnification in the vertical direction. To project this squeezed image, another anamorphic lens is used to horizontally unsqueeze (i.e. stretch or expand) the image so that the projected image is restored to the wide field of view at which the image was originally taken. Although numerous widescreen formats were introduced in the 1950s, most of these formats have become obsolete. The predominant widescreen format in use today is Panavision®, an anamorphic optical system with a 2:1 horizontal squeeze and a 2.40:1 aspect ratio (0.825 inches by 0.690 inches).

FIG. 1 illustrates the SMPTE 195-2000 projection aperture standard for a film frame generated using the Panavision® anamorphic format. Area 100 is the full camera aperture, but area 102 (having an aspect ratio of approximately 1.2:1) is the portion of the film frame that is actually projected. The optical image in area 102 has been squeezed in a 2:1 ratio, and thus exemplary image 104, although appearing as an oval, is actually a circular image that has been photographed. The image capture area 102 in FIG. 1 is typically converted directly to release print film without changing or otherwise manipulating the format, because traditional methods of stretching or squeezing the captured image on an optical bench to produce the release print image would further degrade the image quality. As mentioned above, when projecting the release print film, another anamorphic lens is used to unsqueeze the image. When unsqueezed during projection, area 102 will have an aspect ratio of approximately 2.40:1 (the Panavision® widescreen format), and the oval exemplary image 104 will return to its correct circular shape.

The area 102 in FIG. 1 is off-centered to leave area 106 for an optical soundtrack. This technique of generating an off-centered, right-shifted frame (a.k.a. "Academy frame") was developed because historically, the original film would be put in contact with another piece of film and the soundtrack would be recorded optically onto that piece of film to generate the release print film. Even today, this optical soundtrack is needed on release print film. Therefore, original film is still frequently shot "Academy centered" to leave room for the optically recorded soundtrack and other digital soundtracks.

The Panavision® anamorphic format employs a 2:1 horizontal squeeze to maximize the available image area on the film frame while leaving an area for the optical soundtrack. In general, anamorphic optics are inferior to their spherical counterparts, and produce a degraded image. The greater the amount of anamorphosis (squeezing or stretching), the greater the degree of image degradation. Nevertheless, the use of anamorphosis can produce improved overall image quality because the increased image area on the original and release print film reduces the amount of magnification needed to project the image on a theater screen, and there is a direct correlation between magnification and image degradation, when viewed from the same distance.

New and improved anamorphic formats. As mentioned above, because conventional methods of stretching or squeezing the captured image on an optical bench to produce the release print image would further degrade the image quality, the image capture area 102 in FIG. 1 was typically converted directly to release print film without changing or otherwise manipulating the format. However, new techniques for electronic processing of the captured image (i.e. digital intermediate processing) are able to stretch or squeeze the captured image to produce a release print image without any significant degradation of the image. This technological advance allows the image to be captured in a format that is different from the final release print format. Captured images need not leave room for the optical soundtrack (see 106 in FIG. 1), and can extend to the entire usable width of the film or electronic detector.

As illustrated in FIG. 2, related U.S. patent application entitled "Anamorphic Three-Perforation Imaging System," in recognition of this expansion of the usable image capture area, discloses an anamorphic imaging system that utilizes a maximized image capture area 202 only three perforations in height and extending to practically the entire usable width of the film frame or electronic detector 200 for either cine or digital applications. In film applications, because the image capture area 202 is only three perforations high, the amount of original film needed can be reduced. In digital applications, because digital imagers for electronic cinematography applications are being designed with an aspect ratio of 16:9 and a size that happens to approximate the area of three-perforation film, the image capture area 202 maximizes the active area of digital imagers.

The maximized image capture area 202 reduces magnification and image degradation due to magnification when displayed, and reduces the amount of anamorphic squeeze required during photography, which in turn lowers image degradation due to anamorphosis. The amount of anamorphic squeeze used during image capture is, for example, in the ratio of 2.40:1 over 16:9 or approximately 1.34 to maximize the image capture area. Note than an anamorphic squeeze other than this ratio will not maximize the image capture area and thus will not maximize overall image quality.

Therefore, for both film and digital applications, an image may be captured using the same anamorphic lens having an approximate 1.34:1 horizontal squeeze, which is less than the 2:1 horizontal squeeze of the conventional Panavision® anamorphic format. The reduced degree of anamorphosis combined with using practically the entire area of the three perforation film frame or total digital imaging area results in image quality that is at least equivalent, and potentially superior to, the Panavision® anamorphic format, while still providing an approximate 25% film cost savings over the conventional four perforation format in film applications.

Front and rear anamorphs. Contemporary anamorphic lens systems for cinematographic applications usually comprise a spherical lens unit (either fixed focal length or zoom) combined with either a front or rear cylindrical anamorphic unit mainly comprised of cylindrical lens elements. Note that a cylindrically surfaced element has a radius in one direction (which provides optical power) but is flat in the other direction (which provides no optical power). A cylindrical lens element is therefore non-rotationally symmetrical (as compared to a sphere, which is an axially rotationally symmetrical element).

Anamorphic power, or the compression or expansion ratio of the anamorphic lens, is the ratio of the focal lengths of the lens elements of the anamorph. The compression or expansion ratio of an anamorphic lens is obtained by dividing the focal length measured through the lens in one direction by the focal length measured through the lens in the other direction. Thus, for cylindrical lens elements, there could be no power in one direction, and all the power in the other direction.

"Rear anamorphs" are placed at the image side of the lens, while "front anamorphs" are placed at the object side of the lens. All cylinders (cylindrical lens elements) in conventional rear and front anamorphs are lined up in the same direction. Therefore, conventional anamorphic units provide a compression or expansion of the object in a single direction (typically the horizontal direction for a front anamorph with compression) at the final image.

The anamorph could also be placed within the spherical lens, but there is no great benefit to having an anamorph within the spherical lens. In practice, spherical lenses are generally developed first, and anamorphic lenses are developed later as attachments to the spherical lenses. By implementing anamorphic lenses as attachments, spherical lenses may be used to generate widescreen as well as conventional formats.

Front anamorphs have conventionally been preferred because they collect and deliver radiation in nearly collimated light spaces, allowing them to produce low residual aberrations and good image quality. Front anamorphs are also generally easier to design because the light rays entering and leaving the front anamorph are usually substantially parallel, and also because there are no optics-related restrictions on their size. However, in practice they cannot be too large due to weight considerations. This is particularly true for wide angle lenses, where the front anamorph must capture all of the wide field of view. In conventional front anamorphs, all of the cylindrically surfaced elements line up in the horizontal direction.

Rear anamorphs are usually not preferred because they collect and deliver radiation in convergent light spaces (where light is heading towards the film or detector), which results in large residual aberrations and poor image quality. This also makes rear anamorphs harder to design. The performance of rear anamorphs is also more dependent on the compression or expansion ratios than with front anamorphs. In addition, rear anamorphs should ideally fit into a limited space between the spherical lens and the film or detector to produce the best image quality. However, in practice the size of the required lens elements generally forces rear anamorphs to exceed this preferred space, further contributing to poor image quality. It would be possible to design the spherical lens to enable a longer rear anamorph, but this would result in larger spherical lenses. Practically speaking, for most fixed focal length lenses such as the Panavision® Primo® fixed focal length lens family, there is about 20 mm of axial space between the last lens element and the reflex mirror in which to fit a rear anamorph. For most zoom lenses, there is about 25 mm of axial space available. In conventional rear anamorphs, all of the cylindrically surfaced elements line up in the vertical direction.

Rear anamorphs do have their advantages, however. They are generally much smaller and lighter than front anamorphs. Therefore, although providing relatively poor image quality, rear anamorphs providing a 2:1 squeeze are available. Rear anamorph attachments are generally not used on fixed focal length lenses, because of limited space. However, because fixed focal length lenses are not too large as compared to zoom lenses, a front anamorph, although relatively large, is practical. However, in the case of a contemporary cine zoom lens, which may be over one foot long and have a 4–5" diameter, a front anamorph would substantially increase the size of the lens. In addition, the anamorphic elements would be so large that there would be manufacturability problems. Thus, for zoom lenses there is little choice but to use a rear anamorph.

Shiga rear anamorphs. Previous designs have suffered with the various problems and limitations inherent in conventional anamorphic lenses. For example, Shiga rear anamorphs, manufactured in Japan, were designed to fit within the axial length generally available for zoom lens rear anamorphs (e.g. about 27 mm). All of the cylindrical lens elements in Shiga rear anamorphs line up in the vertical direction (i.e. they have curvature in the vertical direction and are flat in the horizontal direction). Thus, ideally all of the cylindrical power is in the vertical direction, with no power in the horizontal direction.

In addition, the rear anamorph of Shiga also includes one element with a spherical surface. This additional spherically surfaced element is adjustable in the axial direction (along the optical axis) either independently or together with all or part of the anamorphic unit to account for manufacturing tolerances so that the image formed by the Shiga rear anamorph will be aligned with the image plane in the camera. Although this additional spherically surfaced element does align the two focal lengths created by the elements in the horizontal and vertical directions, it does little to enhance the inherent image quality produced by the Shiga rear anamorph, which is generally poor. It is possible to "stop down" the lens (e.g. change the aperture from f2 to f8) to improve the image quality somewhat, but this technique limits the user to the amount of light allowed in by the closed-down iris, and therefore causes other concerns such as reduced versatility due to the limited lighting.

The reason for having cylindrically surfaced elements in the vertical direction in rear anamorphs (like the Shiga rear anamorph) instead of in the horizontal direction as in front anamorphs is related to both the image format, which is usually rectangular (i.e. wider than taller), and the difficulty of readily correcting aberrations in an image space where convergent light beams are present. Because the vertical dimensions in a rear anamorph are smaller than the horizontal dimensions, less refraction is needed in the vertical direction, which translates into better image quality. In addition, this reduced amount of refraction can be achieved in the limited available axial space.

To achieve the desired refraction, the rear anamorph should preferably expand the light vertically. Because the same horizontal unsqueeze projection lens is used for images captured with a front or rear anamorph, a prime or zoom lens with a different effective focal length should be employed in each case in order to produce the same projected image. For example, assuming that the front anamorph has a horizontal squeeze ratio R and the rear anamorph has a vertical expansion ratio R, then in order to get the same image size after projection utilizing a projection lens of horizontal unsqueeze ratio R, the prime or zoom lens needs an effective focal length L for a front anamorph and an effective focal length L/2 for a rear anamorph. In other words, the same final projected image size will occur for a front anamorph coupled to a prime or zoom lens with a 50 mm effective focal length, as for a prime or zoom lens with a 37.3 mm effective focal length coupled to a rear anamorph, so long as the front anamorph squeeze (e.g. 1.34:1), rear expansion (e.g. 1.34:1), and projection unsqueeze (e.g. 1.34:1) are related by the same factor.

The Wallin patent. To focus a spherical lens, one or more lens elements are moved along the optical axis. One artifact of this movement is that the image will "breathe." When an image breathes, the image will show either slightly more or less field of view, creating a slight zooming effect. With spherical lenses, the residual distortion (aberrations due to breathing) is the same in the horizontal and vertical directions. However, with a front anamorph in place, the anamorphic breathing is not the same in the horizontal and vertical directions. In other words, as the image breathes, the objects in the field of view will not maintain their true shape. For example, with a front anamorph that produces a horizontal squeeze, as a person gets closer to the camera and the focal length is shortened, the anamorphic breathing will usually cause the person's face to look wider than normal.

U.S. Pat. No. 2,890,622 (the Wallin patent) attempts to minimize the effects of anamorphic breathing. The Wallin patent discloses a front anamorph that includes two cylindrically surfaced elements, one slightly positively powered and one slightly negatively powered, such that if both were put together there would be zero power. As the focusing lens elements are moved back and forth along the optical axis to focus the image, the two cylindrically surfaced elements of the front anamorph are geared such that they counter-rotate about the optical axis in opposite directions. Thus, the degree of rotation between the two elements is variable and is dependent on how the lens is being focused. This counter-rotating action of the two cylindrically surfaced elements cancels most of the anamorphic breathing. However, although the two elements reduce the anamorphic breathing produced by the anamorph as the lens is focused, they do not change the inherent image quality produced by the anamorph.

As described above and in related U.S. patent application entitled "Anamorphic Three-Perforation Imaging System," with the advent of lower cost, yet higher image quality capture mediums such as 3-perforation film and electronic detectors, a rear anamorph with a reduced compression or expansion ratio is now practical. The reduced compression or expansion ratio enables new design considerations not previously possible, and performance achievements not previously achievable. For example, if front anamorphs could be replaced by rear anamorphs of the same or better performance, there would be a tremendous weight and size savings.

Therefore, there is a need for a rear anamorph with a reduced compression or expansion ratio and improved image quality that obviates and mitigates the limitations of current rear anamorphs.

SUMMARY OF THE INVENTION

The present invention is directed to a rear anamorph with at least two anamorphic lens elements oriented in one direction and at least two anamorphic lens elements oriented in a second direction, and a compression or expansion ratio lower than 2:1, preferably about 1.34:1. Rear anamorphs according to embodiments of the present invention provide higher image quality and reduced aberrations, size and weight as compared to conventional rear and front anamorphs.

In preferred embodiments, the rear anamorph includes eight lens elements, identified as 24 through 31 from object to image side of the rear anamorph. At least two of the cylindrically surfaced elements are oriented in one direction, and at least two of the cylindrically surfaced elements are oriented in another direction. In preferred embodiments the two directions are 90 degrees apart. In particular, using a Cartesian coordinate system in which the x-axis is oriented in the horizontal direction, the y-axis is oriented in the vertical direction, and the z-axis is oriented along the optical axis, in preferred embodiments of the present invention three of the cylindrically surfaced elements are oriented along the y-axis (elements 24–26), and five are oriented along the x-axis (elements 27–31).

In a preferred embodiment, element 24 has positive power, element 25 is a dome-shaped element, element 26 is bi-concave, element 27 has negative power, elements 28 and 29 are two single elements (singlets) cemented together, also called a doublet or a component, and elements 30 and 31 are also a doublet. The lens elements of the rear anamorph are all located within a limited axial space of about 26 mm between the non-anamorphic lens and a reflex mirror (if present).

In the nominal design, air gaps are formed between the cylindrically surfaced elements within the rear anamorph. An air gap identified as AG1 is located between the last element of the prime lens and element 24, air gap AG2 is located between the elements oriented in the y-direction and the elements oriented in the x-direction (i.e. between elements 26 and 27), and air gap AG3 is located between element 31 and the image plane.

The cylindrically surfaced elements oriented in the y-direction (e.g. elements 24–26) may be moved as a group and adjusted along the optical axis with respect to the image plane, and the cylindrically surfaced elements oriented in the x-direction (e.g. elements 27–31) may also be moved as a group and adjusted along the optical axis with respect to the image plane, independent from the adjustments to the cylindrically surfaced elements oriented in the y-direction. In addition, the entire rear anamorph (elements 24–31) may also be moved together, and the exemplary zoom lens may also be moved with respect to element 24. With these independent adjustments, air gaps AG1, AG2 and AG3 may be individually varied so that the two image planes formed by the two focal lengths created by the elements in the horizontal and vertical directions may, after allowing for manufacturing tolerances, be aligned with the image plane in the camera, which improves the inherent sharpness or contrast of the image generated by the rear anamorph.

With a rear anamorph according to embodiments of the present invention, a single spherical taking lens can be utilized for both regular and widescreen applications, and widescreen images can be captured on both film and electronic detectors. In addition, because the performance of the rear anamorph according to embodiments of the present invention rivals that of a front anamorph, the need for a front anamorph is eliminated, and anamorphic lens systems, including zoom lens systems, can be made much smaller and lighter.

BRIEF DESCRIPTION OF THE DRAWINGS

FIG. 13 illustrates the diffraction MTF of selected light rays for a lens system that includes the alternative embodiment rear anamorph of FIGS. 11 and 12 and an exemplary zoom lens.

DETAILED DESCRIPTION OF PREFERRED EMBODIMENTS

Figure 1:
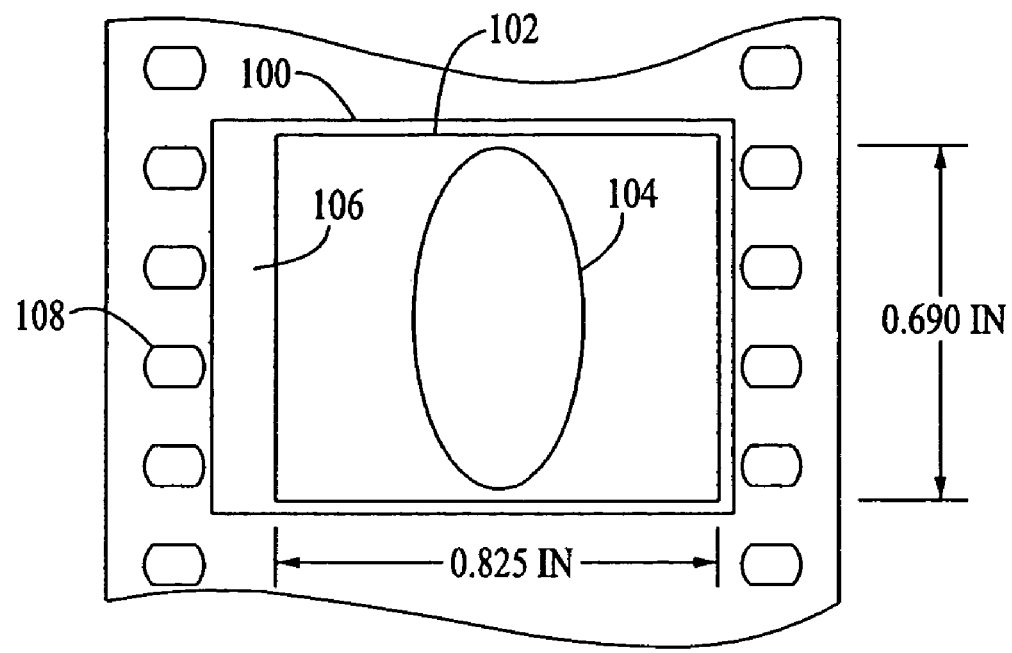
FIG. 1 illustrates the SMPTE 195-2000 projection aperture standard for a film frame generated using the Panavision® anamorphic format.
Figure 2:
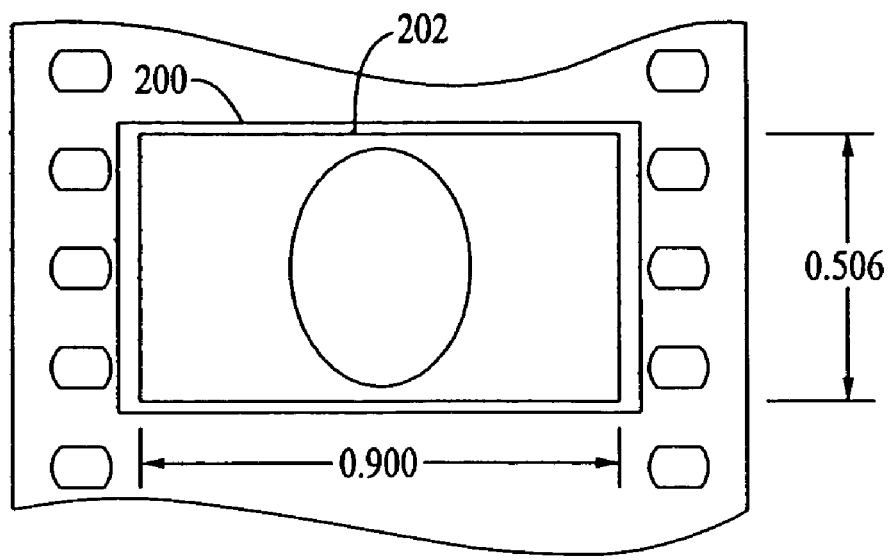
FIG. 2 illustrates an anamorphic imaging system with a 1.34:1 squeeze that utilizes a maximized image capture area only three perforations in height and extends to practically the entire usable width of the film or electronic detector for either cine or digital applications.

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to a rear anamorph with at least two anamorphic lens elements oriented in one direction and at least two anamorphic lens elements oriented in a second direction, and a compression or expansion ratio lower than 2:1. In preferred embodiments, this ratio is about 1.34:1. Rear anamorphs according to embodiments of the present invention provide higher image quality, reduced aberrations, and reduced size and weight as compared to conventional rear and front anamorphs.

The rear anamorphs according to embodiments of the present invention were made possible by recent advances in digital intermediate processing techniques, which in turn made new image capture formats possible, which in turn made anamorphs with reduced compression and expansion ratios (as compared to conventional anamorphs) possible. This reduction in the compression or expansion ratio results in fewer, smaller and (sometimes) less curved lens elements, all of which enable the design of new rear anamorphs with reduced aberrations and improved image quality.

For example, in conventional anamorphs with compression/expansion ratios of 2:1 or greater, the cylindrically surfaced elements have substantial curvature. The elements are also bulbous—thick at the center for a positive lens element, thick at the edges for a negative lens element. These curved, bulbous elements are required for an anamorph with a 2:1 squeeze or greater, because a substantial amount of refraction is required. However, these elements take up a lot of space. For example, because the commonly-oriented lens elements in Shiga rear anamorphs have a substantial amount of curvature and thickness to achieve a 2:1 squeeze, the lens elements consume all of the preferred axial space available for rear anamorphs.

In contrast, in embodiments of the present invention, because of the lower squeeze and compression ratios, less refraction is needed and the lens elements are less bulbous and have smaller curvatures. As a result, fewer and smaller lens elements are needed to achieve the desired compression or expansion. For example, although Shiga rear anamorphs utilize seven cylindrically surfaced lens elements to achieve a 2:1 squeeze, in embodiments of the present invention only three or four elements with power in one direction are sufficient to produce the preferred compression or expansion of about 1.34:1. Because fewer lens elements are needed for compression or expansion, the remainder of the axial space available can contain lens elements oriented in the other direction. These elements are not utilized primarily for compression or expansion, but rather for aberration correction. With cylindrically surfaced elements oriented in two directions, there is anamorphic power in both directions, and therefore aberration control is available in both directions.

Figure 3:
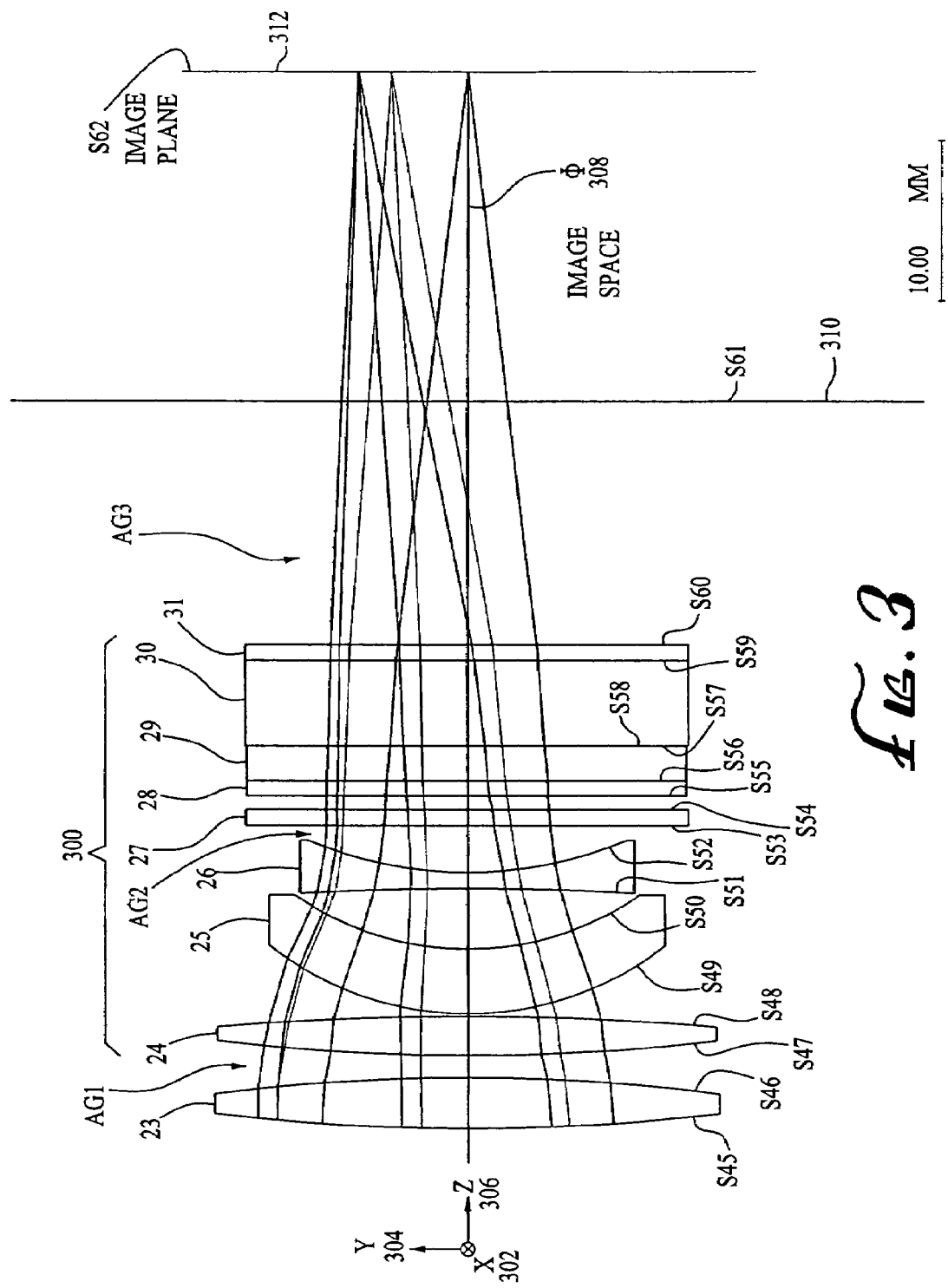
FIG. 3 is a side (elevation) view of a rear anamorph with eight lens elements according to preferred embodiments of the present invention.

FIG. 3 is a side (elevation) view of a rear anamorph 300 with eight lens elements (labeled 24 through 31 in FIG. 3) according to a preferred embodiment of the present invention. It should be understood, however, that alternative embodiments of the present invention may include only seven lens elements. In the seven lens element embodiment, element 31 may be absent. Note that element 23 is the last lens element of a lens unit attached to the rear anamorph 300. The lens elements of the rear anamorph 300 include surfaces S47 through S60. S62 is the surface of an image plane 312, and the optical axis 308 is identified by a Ø. When the rear anamorph 300 is used in film cameras, a reflex mirror 310 having a dummy surface S61 is located between the rear anamorph 300 and the image plane 312. The reflex mirror 310 reflects light to an optical viewfinder (not shown in FIG. 3). Note, however, that if the rear anamorph 300 is used in a digital camera, an electronic detector that may be the same size as a film frame is substituted for the film, and there may be no need for a mirror 310 because digital cameras may present the image to be taken not with an optical viewfinder but rather with a screen such as an LCD screen.

At least two of the cylindrically surfaced elements are oriented in one direction, and at least two of the cylindrically surfaced elements are oriented in another direction. In preferred embodiments the two directions are 90 degrees apart. In particular, using a Cartesian coordinate system in which the x-axis 302 (in and out of the page in FIG. 3) is oriented in the horizontal direction, the y-axis 304 is oriented in the vertical direction, and the z-axis 306 is oriented along the optical axis 308, in preferred embodiments of the present invention three of the cylindrically surfaced elements are oriented along the y-axis (elements 24–26 which have curvature along the y-axis), and four are oriented along the x-axis (elements 27–31 which have curvature along the x-axis (not observable in FIG. 3)).

In the embodiment of FIG. 3, element 24 has positive power, element 25 is a dome-shaped element, element 26 is bi-concave, element 27 has negative power, elements 28 and 29 are two single elements (singlets) stuck together, also called a doublet or a component, and elements 30 and 31 are also a doublet. Note that for the doublet comprised of elements 28 and 29 and the doublet comprised of elements 30 and 31, the coincident facing lens surfaces are given single surface numbers S56 and S59, respectively. The actual radius of each lens surface is set forth in TABLE I below. The net result is that rear anamorph of FIG. 3 vertically stretches a 2.40:1 image in object space onto a 16:9 image in image space. The captured image may then be stretched using optical or electronic processing techniques to reproduce the original 2.40:1 object. Therefore, this preferred embodiment is particularly useful when a widescreen 2.40:1 format is desired.

Figure 4:
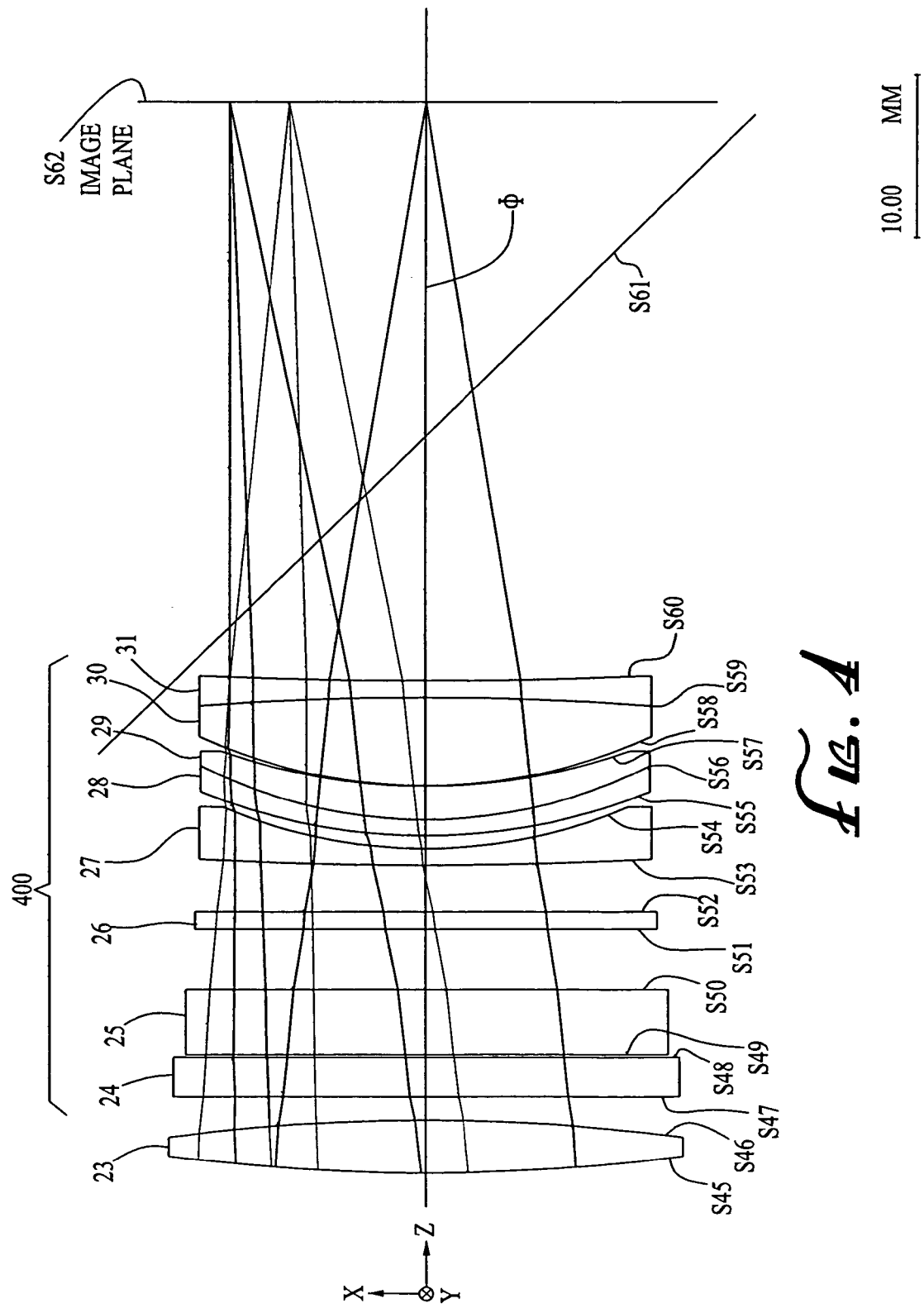
FIG. 4 is a top (plan) view of the rear anamorph with eight lens elements according to preferred embodiments of the present invention.

FIG. 4 is a top (plan) view of the rear anamorph according to preferred embodiments of the present invention, identified in FIG. 4 by reference character 400. Again, note that element 23 is the last lens element of the lens unit attached to the rear anamorph 400. Note that the four elements oriented along the x-axis (elements 27–31) have curvature along the x-axis that is observable in FIG. 4.

Figure 5:
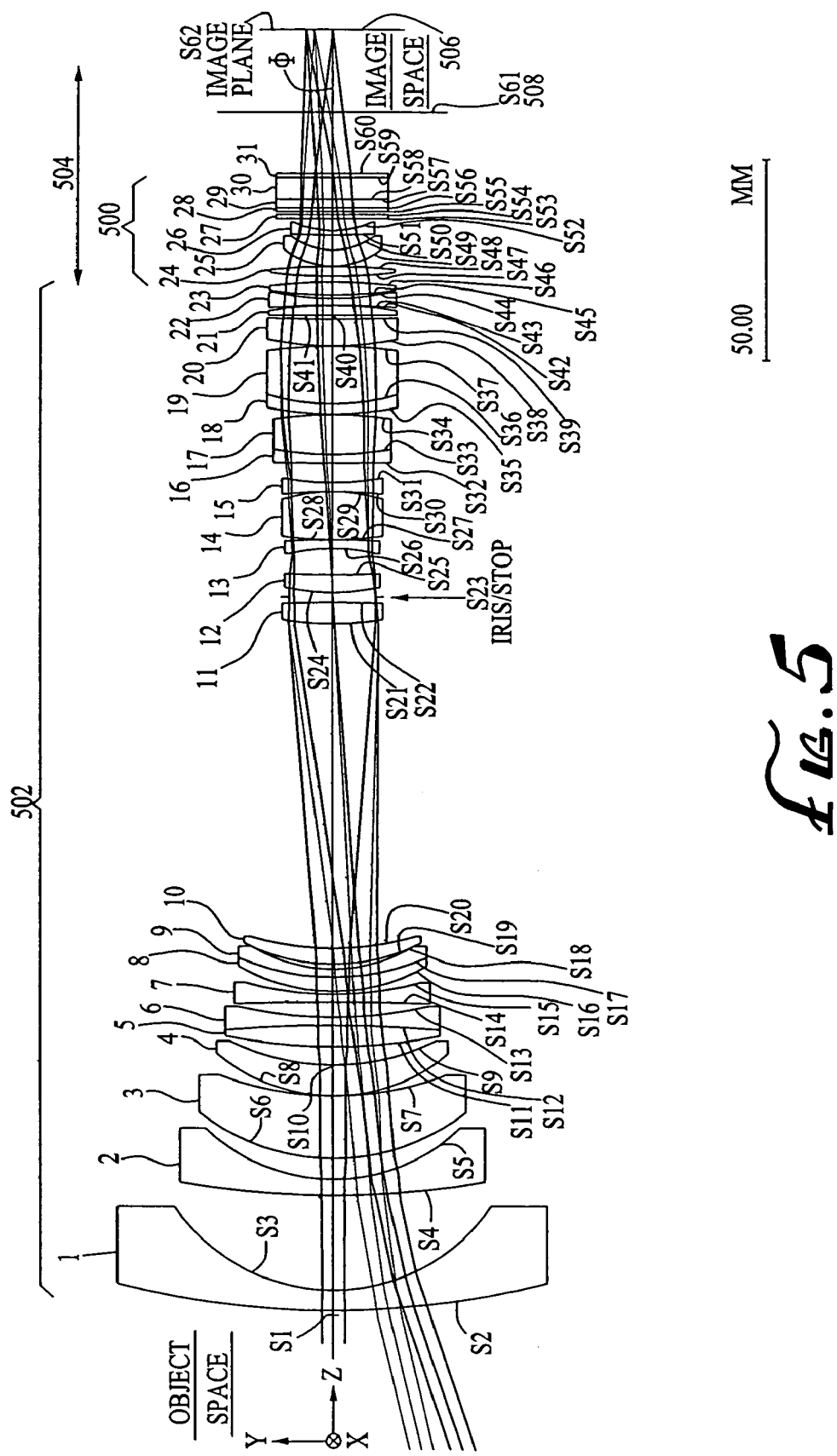
FIG. 5 illustrates a side (elevation) view of the rear anamorph according to preferred embodiments of the present invention attached to an exemplary zoom lens.

FIG. 5 illustrates a side (elevation) view of the rear anamorph according to preferred embodiments of the present invention (identified in FIG. 5 by reference character 500), attached to an exemplary zoom lens 502. It should be understood that although an exemplary zoom lens is shown in FIG. 5 at a particular focal length, other lens units may be used in conjunction with the rear anamorph, including zoom lenses with other focal lengths and prime (fixed focal length) lenses. Note that the exemplary zoom lens 502 in the example of FIG. 5 is the lens described in detail in U.S. Pat. No. 6,122,111, whose contents are incorporated herein by reference. The lens elements of the exemplary zoom lens 502 are identified as elements 1–23, the elements having surfaces S1 through S44. Included in FIG. 5 are dummy surfaces S1, S10, S40 and S61, which are used only for the purpose of calculations. Dummy surface S10 substantially coincides with surface S9, dummy surface S40 substantially coincides with surface S41, and dummy surface S61 substantially coincides with reflex mirror 508 for the focus and zoom lens group positions of the exemplary zoom lens 502 shown in FIG. 5. Note that an electronic detector or film with a 16:9 image capture area is located at the image plane 604 in FIG. 5. The position of the lens elements of the exemplary zoom lens 502 in the example of FIG. 5 create a short focal length (a paraxial effective focal length of about 15.3 mm) and a focus distance of infinity (positions F1 and Z1 in TABLE 2 of U.S. Pat. No. 6,122,111). The lens elements of the rear anamorph 500 are all located within a limited axial space 504 (e.g. about 26 mm) between the last element 23 of zoom lens 502 and the reflex mirror 508.

Figure 6:
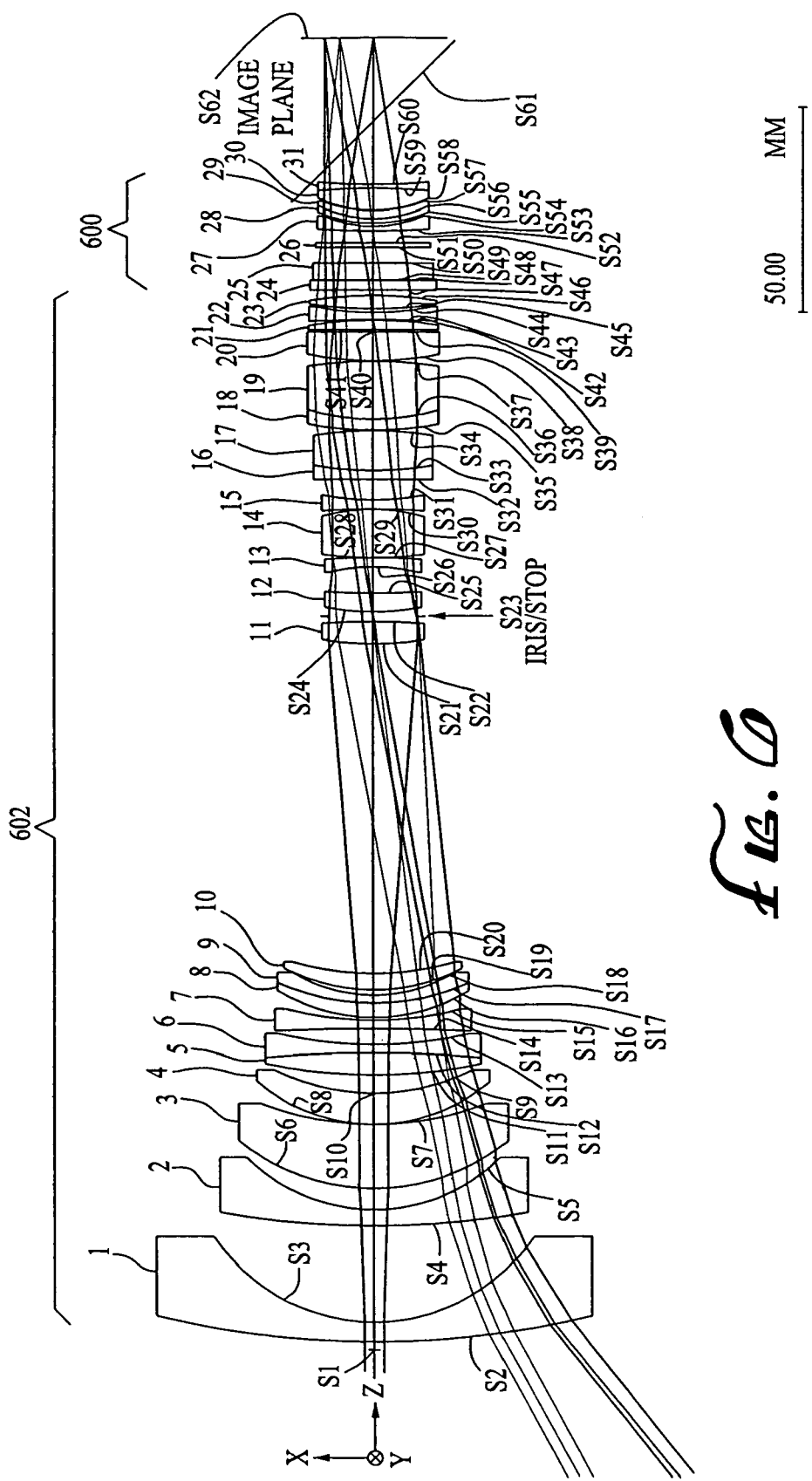
FIG. 6 illustrates a top (plan) view of the rear anamorph according to preferred embodiments of the present invention attached to the exemplary zoom lens.

FIG. 6 illustrates a top (plan) view of the rear anamorph according to preferred embodiments of the present invention (identified as 600 in FIG. 6), attached to the exemplary zoom lens of FIG. 5 (identified as 602 in FIG. 6).

The lens construction and fabrication data for the lens system, which includes the rear anamorph of the present invention and the exemplary zoom lens of U.S. Pat. No. 6,122,111 shown together in FIGS. 5 and 6, is set forth in TABLE I below. The data of TABLE I was extracted from data produced by CODE V® optical design software that is commercially available from Optical Research Associates, Inc., Pasadena, Calif., U.S.A., which was also used to produce the optical diagrams of FIGS. 3–10. Note that the data of TABLE I reflects the zoom lens of U.S. Pat. No. 6,122,111, configured for a short focal length and a focus distance of infinity (positions F1 and Z1 in TABLE 2 of U.S. Pat. No. 6,122,111). All of the data in TABLE I is given at a temperature of 20° C. (68° F.) and standard atmospheric pressure (760 mm Hg). Throughout this specification, including the Tables, all measurements are in millimeters (mm) with the exception of wavelengths which are in nanometers (nm).

TABLE I

OPTICAL PRESCRIPTION

| Item | Surface No. | Shape | Y Radius of Curvature (mm) | X Radius of Curvature (mm) | Thickness or Separation (mm) | Material Type | Material Code | Material Name | Maximum Aperture Heights in Directions Radial (mm) | Y (mm) | X (mm) |
|---|---|---|---|---|---|---|---|---|---|---|---|
| Object Plane | 0 | Flat | Flat | Flat | Infinite | Air | | | | | |
| Dummy Surface | S1 | Flat | Flat | Flat | 1.000 | Air | | | | | |
| 1 | S2 | Sphere | 218.818 | 218.818 | 5.000 | Glass | 438950 | FPL53 | 50.12 | | |
|  | S3 | Asphere | 38.506 | 38.506 | 23.534 | Air | | | 38.15 | | |
| 2 | S4 | Sphere | 222.116 | 222.116 | 3.800 | Glass | 618634 | PHM52 | 35.31 | | |
|  | S5 | Sphere | 43.238 | 43.238 | 5.300 | Air | | | 30.67 | | |
| 3 | S6 | Sphere | 51.336 | 51.336 | 15.592 | Glass | 805254 | PBH6W | 30.72 | | |
|  | S7 | Sphere | 77.033 | 77.033 | 0.100 | Air | | | 27.53 | | |
| 4 | S8 | Sphere | 43.190 | 43.190 | 7.697 | Glass | 438950 | FPL53 | 26.53 | | |
|  | S9 | Sphere | 55.573 | 55.573 | 4.431 | Air | | | 24.80 | | |

TABLE I-continued

OPTICAL PRESCRIPTION

| Item | No. | Surface Shape | Y Radius of Curvature (mm) | X Radius of Curvature (mm) | Thickness or Separation (mm) | Type | Material Code | Name | Maximum Aperture Heights in Directions Radial (mm) | Y (mm) | X (mm) |
|---|---|---|---|---|---|---|---|---|---|---|---|
| Dummy Surface | S10 | Flat | Flat | Flat | 0.109 | Air | | | | | |
| 5 | S11 | Sphere | 129.546 | 129.546 | 5.181 | Glass | 636354 | PBM6 | 24.45 | | |
| 6 | S12 | Sphere | −318.127 | −318.127 | 2.200 | Glass | 804396 | LAH63 | 23.90 | | |
| | S13 | Sphere | 97.742 | 97.742 | 3.870 | Air | | | 22.48 | | |
| 7 | S14 | Sphere | −515.815 | −515.815 | 2.170 | Glass | 762401 | LAM55 | 22.29 | | |
| | S15 | Sphere | 86.505 | 86.505 | 0.700 | Air | | | 21.63 | | |
| 8 | S16 | Sphere | 44.464 | 44.464 | 3.560 | Glass | 847239 | PBH53W | 21.57 | | |
| 9 | S17 | Sphere | 56.665 | 56.665 | 2.000 | Glass | 806410 | LAH53 | 21.05 | | |
| | S18 | Sphere | 38.814 | 38.814 | 1.380 | Air | | | 20.14 | | |
| 10 | S19 | Sphere | 47.058 | 47.058 | 3.798 | Glass | 805254 | PBH6W | 20.15 | | |
| | S20 | Sphere | 70.812 | 70.812 | 81.386 | Air | | | 19.74 | | |
| 11 | S21 | Sphere | 73.576 | 73.576 | 5.284 | Glass | 618634 | PHM52 | 11.34 | | |
| | S22 | Sphere | −467.060 | −467.060 | 1.300 | Air | | | 10.82 | | |
| Iris | S23 | Flat | Flat | Flat | 1.320 | Air | | | 10.51 | | |
| 12 | S24 | Sphere | 64.719 | 64.719 | 4.599 | Glass | 618634 | PHM52 | 10.62 | | |
| | S25 | Sphere | 280.545 | 280.545 | 6.476 | Air | | | 10.48 | | |
| 13 | S26 | Sphere | −44.031 | −44.031 | 2.150 | Glass | 804466 | LAH65 | 10.31 | | |
| | S27 | Sphere | −276.492 | −276.492 | 0.100 | Air | | | 10.59 | | |
| 14 | S28 | Sphere | 104.569 | 104.569 | 11.912 | Glass | 438950 | FPL53 | 10.70 | | |
| | S29 | Sphere | −45.864 | −45.864 | 0.100 | Air | | | 11.27 | | |
| 15 | S30 | Sphere | −125.907 | −125.907 | 2.200 | Glass | 734515 | LAL59 | 11.24 | | |
| | S31 | Sphere | 63.152 | 63.152 | 4.979 | Air | | | 11.32 | | |
| 16 | S32 | Sphere | 14624.000 | 14624.000 | 2.250 | Glass | 720347 | BPH8 | 12.02 | | |
| 17 | S33 | Sphere | 84.356 | 84.356 | 9.972 | Glass | 603655 | PHM53 | 12.34 | | |
| | S34 | Sphere | −87.065 | −87.065 | 0.100 | Air | | | 13.37 | | |
| 18 | S35 | Sphere | 88.905 | 88.905 | 2.550 | Glass | 521526 | SSL5 | 13.70 | | |
| 19 | S36 | Sphere | 56.430 | 56.430 | 14.288 | Glass | 438950 | FPL53 | 13.84 | | |
| | S37 | Sphere | −114.090 | −114.090 | 0.100 | Air | | | 14.68 | | |
| 20 | S38 | Sphere | 84.019 | 84.019 | 6.824 | Glass | 720460 | LAM61 | 14.83 | | |
| | S39 | Sphere | 391.268 | 391.268 | 0.600 | Air | | | 14.60 | | |
| Dummy Surface | S40 | Flat | Flat | Flat | 0.100 | Air | | | | | |
| 21 | S41 | Sphere | 1395.656 | 1395.656 | 2.527 | Glass | 785257 | PBH11W | 14.58 | | |
| | S42 | Sphere | −105.898 | −105.898 | 0.100 | Air | | | 14.54 | | |
| 22 | S43 | Sphere | −220.862 | −220.862 | 1.800 | Glass | 901315 | LAH78 | 14.44 | | |
| | S44 | Asphere | 72.073 | 72.073 | 0.911 | Air | | | 14.25 | | |
| 23 | S45 | Sphere | 128.877 | 128.877 | 3.169 | Glass | 720460 | LAM61 | 14.27 | | |
| | S46 | Sphere | −118.373 | −118.373 | 1.432 | Air | | | 14.29 | | |
| 24 | S47 | Y Cylinder | 136.373 | Flat | 2.444 | Glass | 816466 | SLAH59 | 14.12 | | |
| | S48 | Y Cylinder | −176.528 | Flat | 0.125 | Air | | | 14.01 | | |
| 25 | S49 | Y Cylinder | 19.172 | Flat | 4.090 | Glass | 816466 | SLAH59 | 13.48 | 11.10 | |
| | S50 | Y Cylinder | 18.137 | Flat | 3.765 | Air | | | 13.22 | 9.60 | |
| 26 | S51 | Y Cylinder | −192.507 | Flat | 1.047 | Glass | 670473 | SBAH10 | 12.84 | 9.30 | |
| | S52 | Y Cylinder | 24.412 | Flat | 2.982 | Air | | | 12.77 | 8.80 | |
| 27 | S53 | X Cylinder | Flat | 385.928 | 1.039 | Glass | 816466 | SLAH59 | 12.48 | | |
| | S54 | X Cylinder | Flat | 31.262 | 0.793 | Air | | | 12.27 | | |
| 28 | S55 | X Cylinder | Flat | 35.527 | 0.978 | Glass | 626357 | STIM1 | 12.39 | | |
| 29 | S56 | X Cylinder | Flat | 29.063 | 2.085 | Glass | 847238 | STIH53 | 12.38 | | |
| | S57 | X Cylinder | Flat | 36.170 | 0.076 | Air | | | 12.37 | | |
| 30 | S58 | X Cylinder | Flat | 32.520 | 5.371 | Glass | 788474 | SLAH64 | 12.47 | | |
| 31 | S59 | X Cylinder | Flat | −182.118 | 1.037 | Glass | 805254 | STIH6 | 12.45 | | |
| | S60 | X Cylinder | Flat | 261.747 | 15.231 | Air | | | | 8.40 | 11.80 |
| Dummy Surface | S61 | Flat | Flat | | 20.523 | Air | | | | | |
| Image Plane | S62 | Flat | Flat | | 0.000 | Air | | | 13.60 | | |

Surface profiles of aspheric surfaces S3 and S44 are governed by the following conventional equation:

$$Z = \frac{(CURV)Y^2}{1+(1-(1+K)(CURV)^2Y^2)^{1/2}} +$$

$$(A)Y^4 + (B)Y^6 + (C)Y^8 + (D)Y^{10} + (E)Y^{12}$$

where
CURV=1/(Radius of Curvature)
Y=Aperture height, measured perpendicular to optical axis
K, A, B, C, D, E=Coefficients
Z=Position of surface profile for a given Y value, as measured along the optical axis from the pole (i.e. axial vertex) of the surface.
The coefficients for the surface S3 of lens 1 are:
K=−1.5066
A=2.0962×10$^{-6}$
B=−7.9395×10$^{-10}$
C=6.1324×10$^{-13}$
D=−2.8537×10$^{-16}$
E=3.1072×10$^{-20}$
The coefficients for the surface S44 of lens 22 are:
K=−2.2286
A=2.2871×10$^{-6}$
B=−2.1575×10$^{-9}$
C=9.2167×10$^{-12}$
D=−1.2856×10$^{-14}$
E=0

The foregoing footnote to TABLE I includes the equation for calculating the shape of the aspheric surfaces S3 and S44 for the value Z, wherein CURV is the curvature at the pole of the surface, Y is the height or distance from the optical axis of a specific point on the surface of the glass, K is the conic coefficient, and A, B, C, D, and E are the 4th, 6th, 8th, 10th and 12th, respectively, order deformation coefficients which are a well known equation and values for calculating the shape of an aspheric surface.

It should also be noted that the zoom lens system of FIGS. 5 and 6 is provided with three aperture/field stops at the surfaces S11, S44 and S60, which control the size and shape of the aperture through which light rays may pass at each of those points to thereby cause any light rays in the zoom lens system radially beyond those diameters to be stopped.

In TABLE I, the first column "ITEM" identifies each optical element and each location, i.e. object plane, dummy surface, etc., with the same numeral or label as used in FIGS. 5 and 6. The second column "Surface No." is a list of the surface numbers of the object (line "O" in FIGS. 5 and 6 and "Object Plane" in TABLE I), the dummy optical surfaces S1, S10, S40 and S61, the Iris (stop) S23 and each of the actual surfaces of the lenses, as identified in FIGS. 5 and 6. The third column indicates the shape of the surfaces.

The fourth and fifth columns, headed by the legend "Y Radius of Curvature" and "X Radius of Curvature", is a list of the optical surface radius of curvature for each direction of each surface, with a minus sign (−) meaning the center of the radius of curvature is to the left of the surface, as viewed in FIGS. 5 and 6, and "Flat" meaning either an optically flat surface or a dummy optical surface. The sixth column "Thickness or Separation" is the axial distance between that surface (fourth column) and the next surface; for example, the distance between surface S2 to surface S3 is 5.000 mm. The next three columns of TABLE I (columns seven, eight and nine) relate to the "Material" between that surface (second column) and the next surface to the right in FIGS. 5 and 6, with the seventh column "Type" indicating whether there is a lens (Glass) or empty space (Air) between those two surfaces. All of the lenses are glass, and the eighth column "Code" identifies the optical glass. For convenience, all of the lens glass has been selected from glass available from Ohara Corporation, and the ninth column "Name" lists the Ohara identification for each glass type, but it is to be understood that any equivalent or adequate glass may be used.

The last column of TABLE I headed "Maximum Aperture Heights in Directions" provides the maximum diameter for each surface through which the light rays pass, for a given direction. All of the maximum aperture diameters, except for the Iris surface S23, are given at a wavelength of 546.1 nanometers for a maximum radial image height of 13.60 mm and a constant f-number of f/3.66 at the Image Plane. The maximum radial aperture height of the Iris surface S23 is given in TABLE I at a wavelength of 546.1 nanometers and an f-number of f/3.66 at the Image Plane. Surface S60 has a maximum aperture height in Y of 8.40 mm and a maximum aperture height in X of 11.80 mm. Surface S60 has a rectangular aperture as compared to the circular apertures of most other surfaces.

The exemplary zoom lens of FIGS. 5 and 6 (the zoom lens of U.S. Pat. No. 6,122,111) has a full field of view (half angle) in object space of 41.63°. The exemplary zoom lens system of FIGS. 5 and 6 (including the rear anamorph according to embodiments of the present invention) has a full field of view (half angle) in object space of 42.34°. The difference between the two is partly due to residual distortion. The paraxial effective focal length of the exemplary lens system is about 20.60 mm in the Y-direction and about 15.81 mm in the X-direction. The f-number for the exemplary lens system is about 4.10 in the Y-direction and about 3.15 in the X-direction, providing a theoretical effective combined f-number of about 3.66. Note that this is less than the f-number for the exemplary zoom lens without the rear anamorph (f2.2 as discussed in column 4, lines 35–36 in U.S. Pat. No. 6,122,111). However, some loss is typical for realizing the desired image quality in rear anamorph systems. In any case, film and electronic detectors are becoming more light sensitive, thus compensating for the effect of the loss.

The three cylindrically surfaced elements of the rear anamorph oriented in the Y-direction create a paraxial effective focal length in the exemplary zoom lens system of about −155.24 mm, which provides the optical power needed to perform the vertical stretching of the image. The five cylindrically surfaced elements of the rear anamorph oriented in the X-direction create a paraxial effective focal length in the exemplary zoom lens system of about −2505.60 mm, which represents relatively little optical power (because optical power is equal to 1/focal length). Therefore, because −2505.60/−155.24=16.14, most of the anamorphic power is in the three cylindrically surfaced elements of the rear anamorph oriented in the Y-direction. Nevertheless, the five cylindrically surfaced elements of the rear anamorph oriented in the X-direction provide some anamorphic power and mainly perform aberration control.

Figure 7:
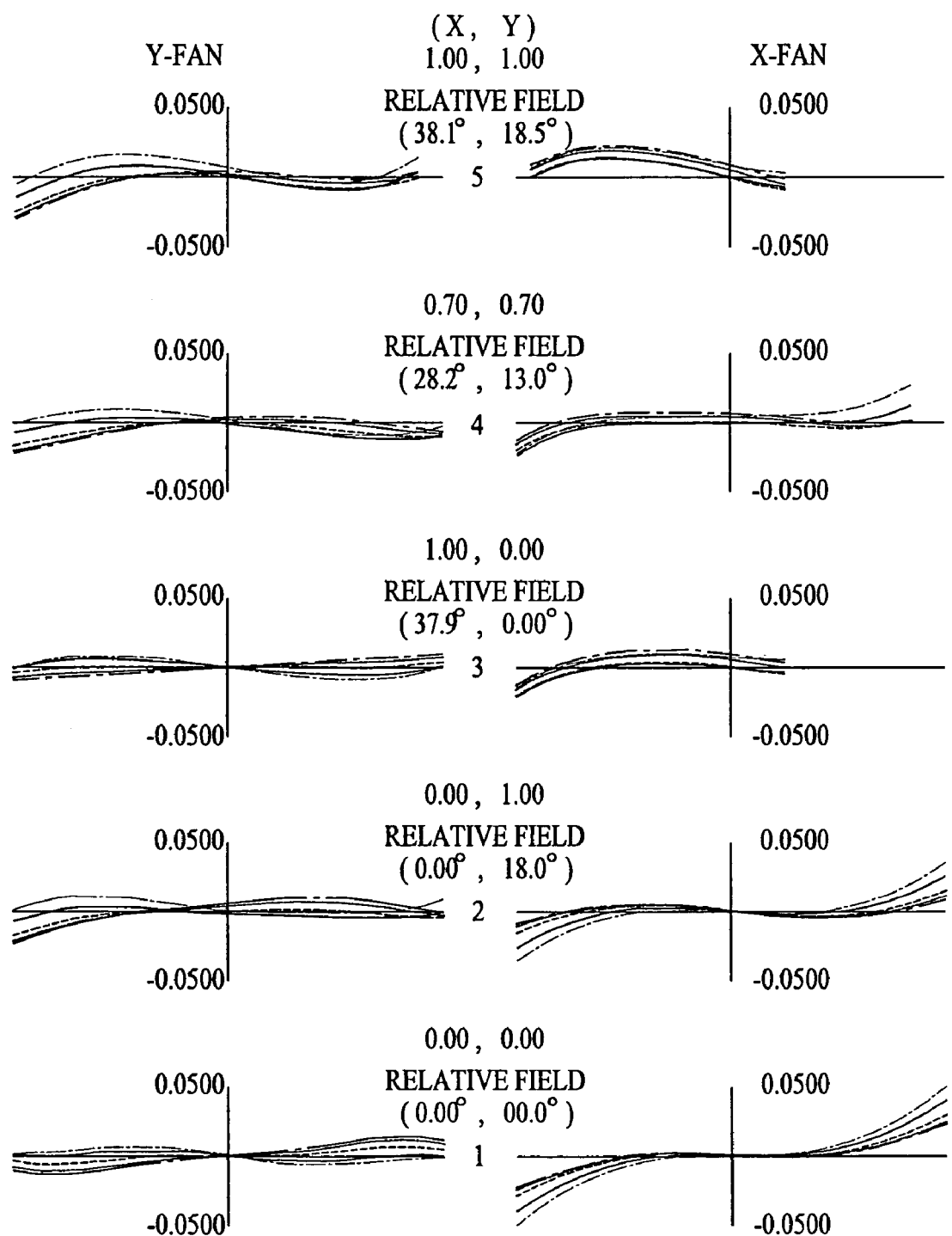
FIG. 7 illustrates ray aberration plots for the lens system of FIGS. 5 and 6 according to embodiments of the present invention.

FIG. 7 illustrates ray aberration plots for the lens system of FIGS. 5 and 6 according to embodiments of the present invention. These ray aberration plots are shown in a conventional manner using five separate pairs of plots, each pair of plots representing light rays entering the lens system at a different relative field height. The left plot in each pair of plots illustrates the y-fan, while the right plot illustrates the x-fan, with the y-axis representing residual aberrations in millimeters. Each plot illustrates the ray aberrations for light rays of five different wavelengths.

The first (bottom) pair of plots represent light rays entering the lens system with a relative field height of x=0.00, y=0.00 (normalized in image space) and an angle with respect to the x-axis and y-axis of (0.00°, 0.00°) respectively (i.e. along the optical axis at the center of the image). The second pair of plots represent light rays entering the lens system with a relative field height of x=0.00, y=1.00 and an angle in the x-direction and y-direction of (0.00°, 18.0°) respectively (i.e. at the extreme top-center of the image, entering the lens system with an angle of 18.0° with respect to the optical axis). The third pair of plots represent light rays entering the lens system with a relative field height of x=1.00, y=0.00 and an angle in the x-direction and y-direction of (37.9°, 0.00°) respectively (i.e. at the extreme right-center of the image, entering the lens system with an angle of 37.9° with respect to the optical axis). The fourth pair of plots represent light rays entering the lens system with a relative field height of x=0.70, y=0.70 and an angle in the x-direction and y-direction of (28.2°, 13.00°) respectively (i.e. to the right of and above the optical axis in the upper right quadrant of the image, entering the lens system with an angle of 28.2° in the x-direction and 13.0° in the y-direction). The fifth (top) pair of plots represent light rays entering the lens system with a relative field height of x=1.00, y=1.00 and an angle in the x-direction and y-direction of (38.1°, 18.5°) respectively (i.e. in the extreme upper right corner of the image, entering the lens system with an angle of 38.1° in the x-direction and 18.5° in the y-direction). As will readily appear to those skilled in the art, the relatively flat (in the vertical direction) and clustered performance curves establish that in all positions the zoom lens system including the rear anamorph of the present invention performs exceptionally well.

Figure 8:
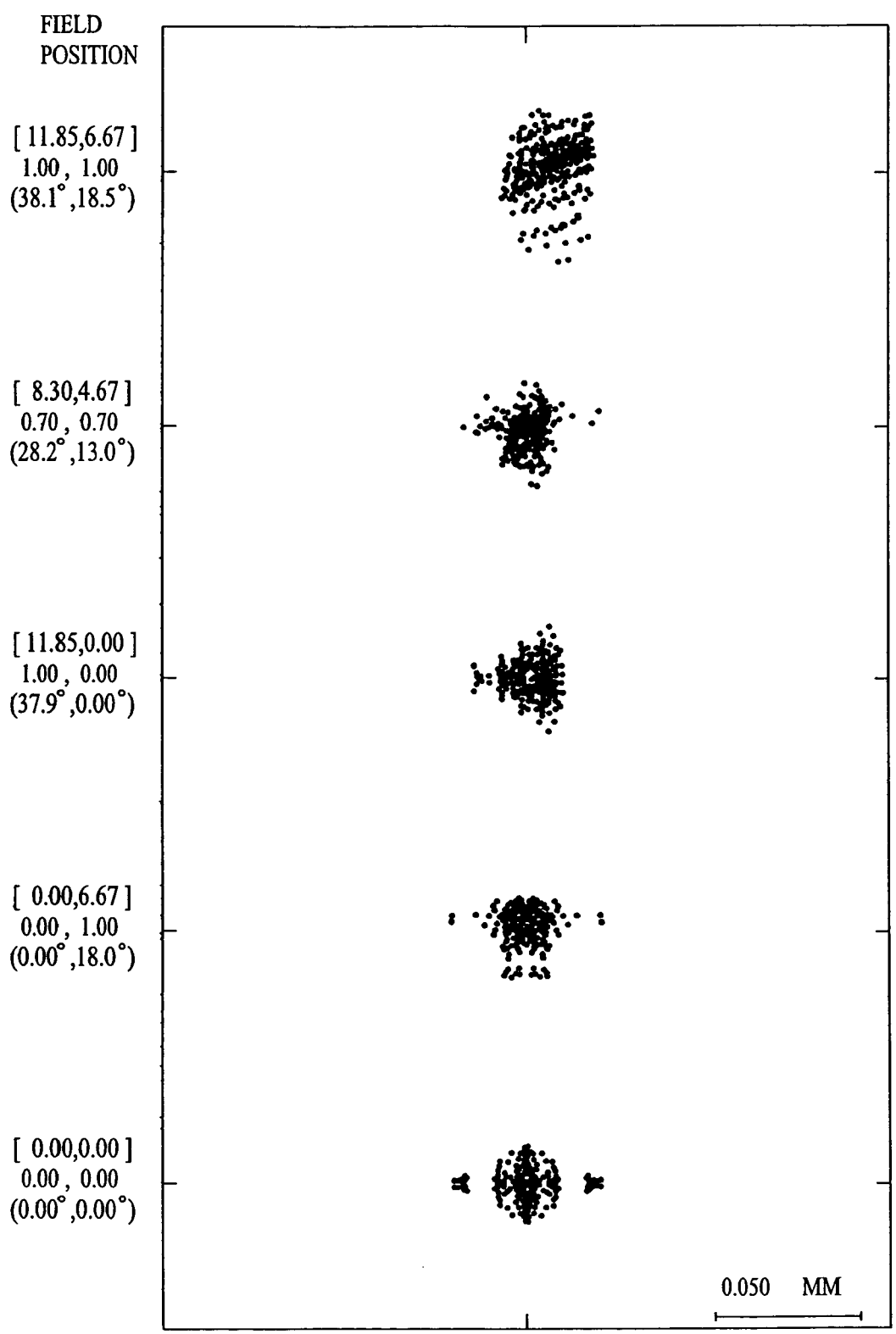
FIG. 8 illustrates five separate spot diagrams for the lens system of FIGS. 5 and 6 at the image plane according to embodiments of the present invention.

FIG. 8 illustrates five separate spot diagrams for the lens system of FIGS. 5 and 6 at the image plane (surface S62) according to embodiments of the present invention. These five spot diagrams corresponds to the five ray aberration plots of FIG. 7, each spot diagram representing light rays entering the lens system at the same relative field heights shown in FIG. 7. Included in the field position at the left of FIG. 8 are the actual X and Y field heights in image space of the light rays in millimeters (shown in brackets in the format [X mm, Y mm]). These actual field heights are applicable to FIG. 7 as well. As will readily appear to those skilled in the art, the relatively tightly clustered spot diagrams establish that in all positions the zoom lens system including the rear anamorph of the present invention performs exceptionally well.

Figure 9:
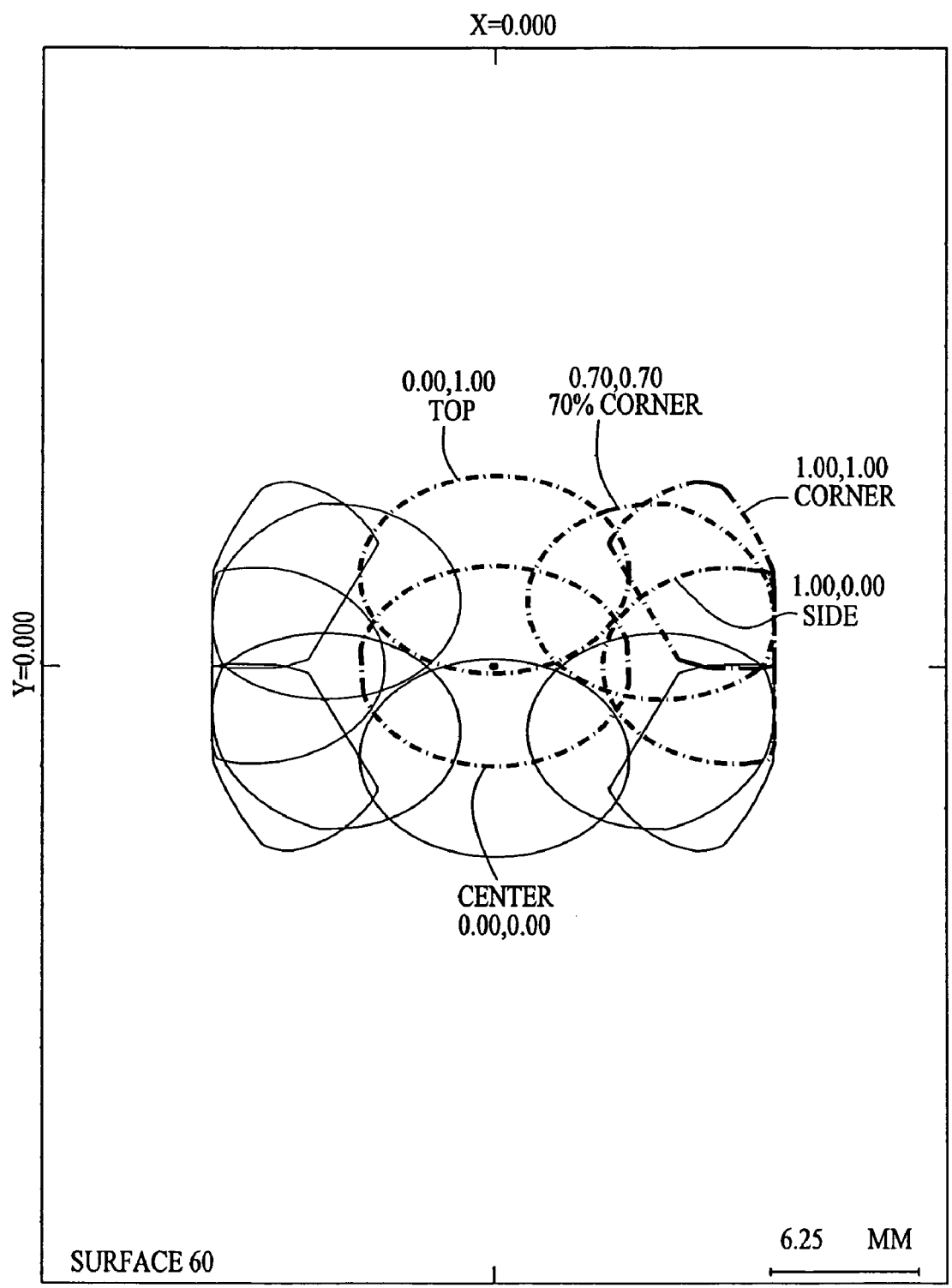
FIG. 9 illustrates the footprints of selected light rays for the lens system of FIGS. 5 and 6 including the effect of all of the field stops at surface S60 according to embodiments of the present invention.

FIG. 9 illustrates the footprints of selected light rays for the lens system of FIGS. 5 and 6 including the effect of all of the field stops at surface S60 according to embodiments of the present invention. In TABLE I, field stops are present at surfaces S11, S44 and S60. The selected light rays are the same light rays entering the lens system at the relative field heights shown in FIGS. 7 and 8. In FIG. 9, the footprints corresponding to the plots and spot diagrams of FIGS. 7 and 8 are found in the upper right quadrant and are bolded for visibility. In addition, the corresponding footprints for the corresponding light rays in the other quadrants are also shown in FIG. 9. Note that the truncated side footprint is due to the limiting apertures of surface S60, and that the cutoff edges of the corner footprint are due to the combined effects of the limiting apertures of surfaces S11, S44 and S60. In terms of relative illumination, the corner footprint is about 50% of the area as compared to the center (on-axis) footprint, which indicates that not too much light has been lost in the regions farthest from the center of the image.

Figure 10:
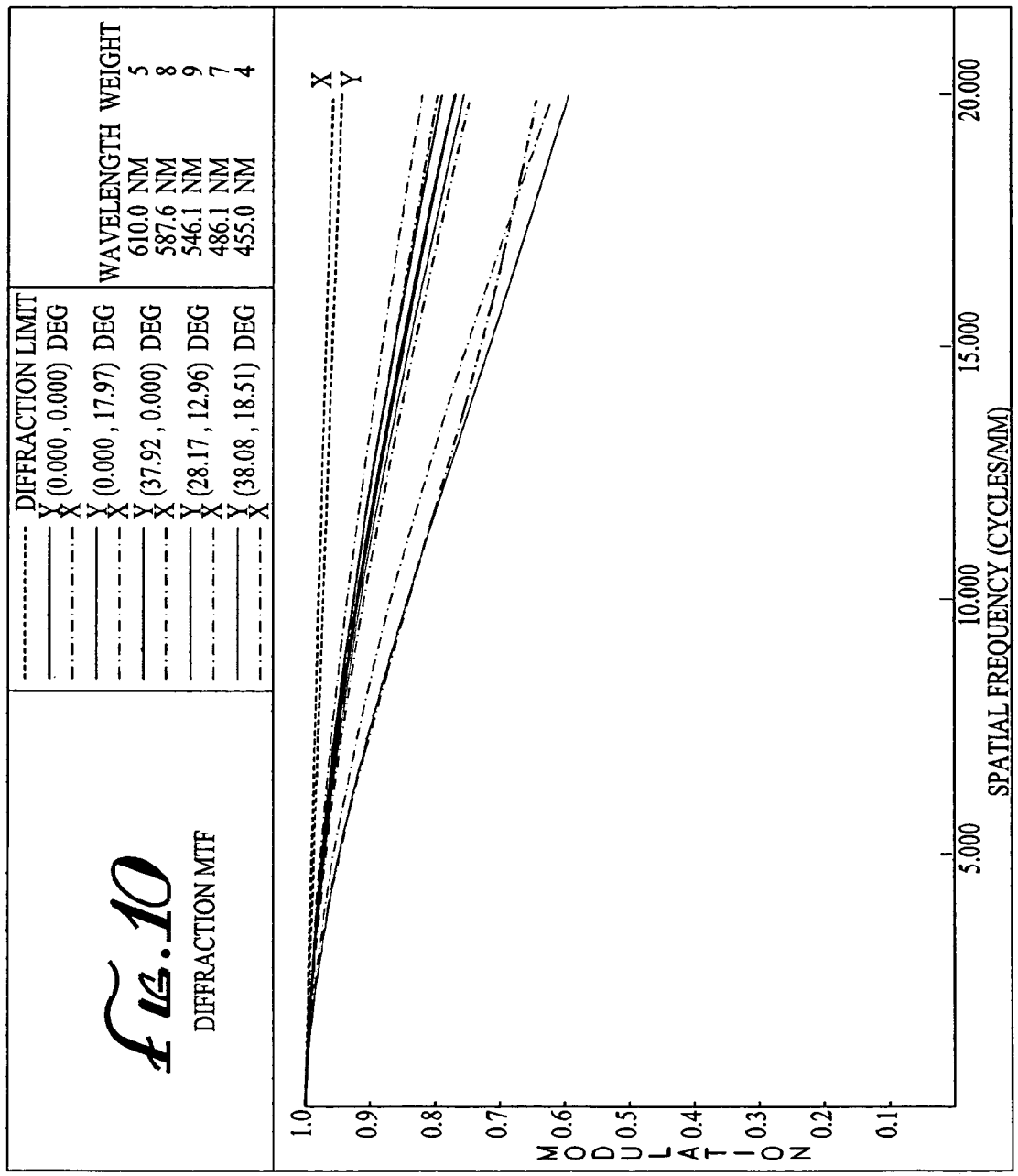
FIG. 10 illustrates the diffraction modulation transfer function (MTF) of selected light rays for the lens system of FIGS. 5 and 6 according to embodiments of the present invention.

FIG. 10 illustrates the diffraction modulation transfer function (MTF) for the same light rays entering the lens system at the relative field heights shown in FIGS. 7–9 according to embodiments of the present invention. In FIG. 10, the x-axis represents the spatial frequency (resolution) in cycles per millimeter, and the y-axis represents a relative modulation value (an indication of image quality). The diffraction MTF curves of FIG. 10 are polychromatic, using the same wavelengths and X and Y field fans as in FIG. 7, but with wavelength weights. Note that at a spatial frequency of about 20 cycles/mm, at the extreme right distal end of the plots, the diffraction MTF for seven of the field fans are clustered with a modulation range of about 0.75 to 0.82, and the diffraction MTF for three of the field fans are clustered with a modulation range of about 0.60 to 0.65. In general, diffraction MTFs greater than 0.50 are desired. For purposes of comparison, the polychromatic diffraction MTF data shown in column three of TABLE 2 of U.S. Pat. No. 6,122,111 includes diffraction MTF data in the 0.40 range. Thus, the addition of the rear anamorph according to embodiments of the present invention to the zoom lens of U.S. Pat. No. 6,122,111 actually improves the performance of the zoom lens. In addition, the full field distortion shown in column three of TABLE 2 of U.S. Pat. No. 6,122,111 is −4.5%, as compared to a low full field distortion of about 2% achievable using the rear anamorph according to embodiments of the present invention.

Referring again to the example of FIG. 3, in embodiments of the present invention, air gaps are formed between cylindrically surfaced elements. In the example of FIG. 3, air gap AG1 is located between the last element 23 of the exemplary zoom lens attached to the rear anamorph 300 and element 24, air gap AG2 is located between elements 26 and 27, and air gap AG3 is located between element 31 and the image plane 312. Other air gaps are also located between other elements.

As mentioned above, rear anamorphs according to embodiments of the present invention have two focal lengths, each focal length resulting from the group of lens elements oriented in one of the two different directions. The two focal lengths will be slightly different in the as-built product due to manufacturing tolerances. With two different focal lengths, two image planes are formed, and if the image planes are not aligned, images will look sharp in the two directions, but will be blurred in between.

In embodiments of the present invention, the cylindrically surfaced elements oriented in the y-direction (e.g. elements 24–26 in FIG. 3) may be moved as a group and adjusted along the optical axis 308 with respect to the image plane 312, and the cylindrically surfaced elements oriented in the x-direction (e.g. elements 27–31 in FIG. 3) may also be moved as a group and adjusted along the optical axis 308 with respect to the image plane 312, independent from the adjustments to the cylindrically surfaced elements oriented in the y-direction. In preferred embodiments, elements 24–26 and elements 27–31 may have axial movement of about +/−1.1 mm and +/−1.5 mm, respectively, along the optical axis. In addition, the entire rear anamorph (elements 24–31) may also be moved together, and the exemplary zoom lens (of which only element 23 is shown in FIG. 3) may also be moved with respect to element 24.

With these independent adjustments, air gaps AG1, AG2 and AG3 may be individually varied so that the two image planes formed by the two focal lengths created by the elements in the horizontal and vertical directions may, after allowing for manufacturing tolerances, be aligned with the image plane in the camera, which improves the inherent sharpness or contrast of the image generated by the rear anamorph. In alternative embodiments, other gaps between elements may be adjusted by movement of cylindrically surfaced elements, either individually or as a group, to align the two image planes and improve the inherent sharpness or contrast of the image. As a result of these alignments, aberration control and image quality similar to that of spherical lenses is obtained. Images can be captured in a widescreen format with practically the same performance as images captured in the regular 16:9 format.

In alternative embodiments of the present invention, the rear anamorph of FIGS. 3 and 4 may be scaled down in size and re-optimized such that the overall vertex length (axial length) of the rear anamorph is about 20 mm. This scaled down rear anamorph is suitable for short back focal length lenses such as wide angle prime (fixed focal length) lenses.

In further alternative embodiments of the present invention, the three cylindrically-surfaced elements of the rear anamorph oriented in the vertical direction may be designed to produce an image compressed in the vertical direction. Alternatively, a fourth cylindrically surfaced element may be re-oriented to the vertical direction (i.e. resulting in four elements oriented in the vertical direction and four elements oriented in the horizontal direction) to produced an image compressed in the vertical direction. The resulting image could then be captured using an electronic detector. The captured image may then be horizontally squeezed and displayed using digital imaging techniques. For example, a cellular telephone or point-and-shoot camera with a zoom lens and a rear anamorph according to this alternative embodiment of the present invention may squeeze the image vertically during capture, then electronically squeeze the image horizontally prior to displaying the final image on the display of the cellular telephone or camera.

Figure 11:
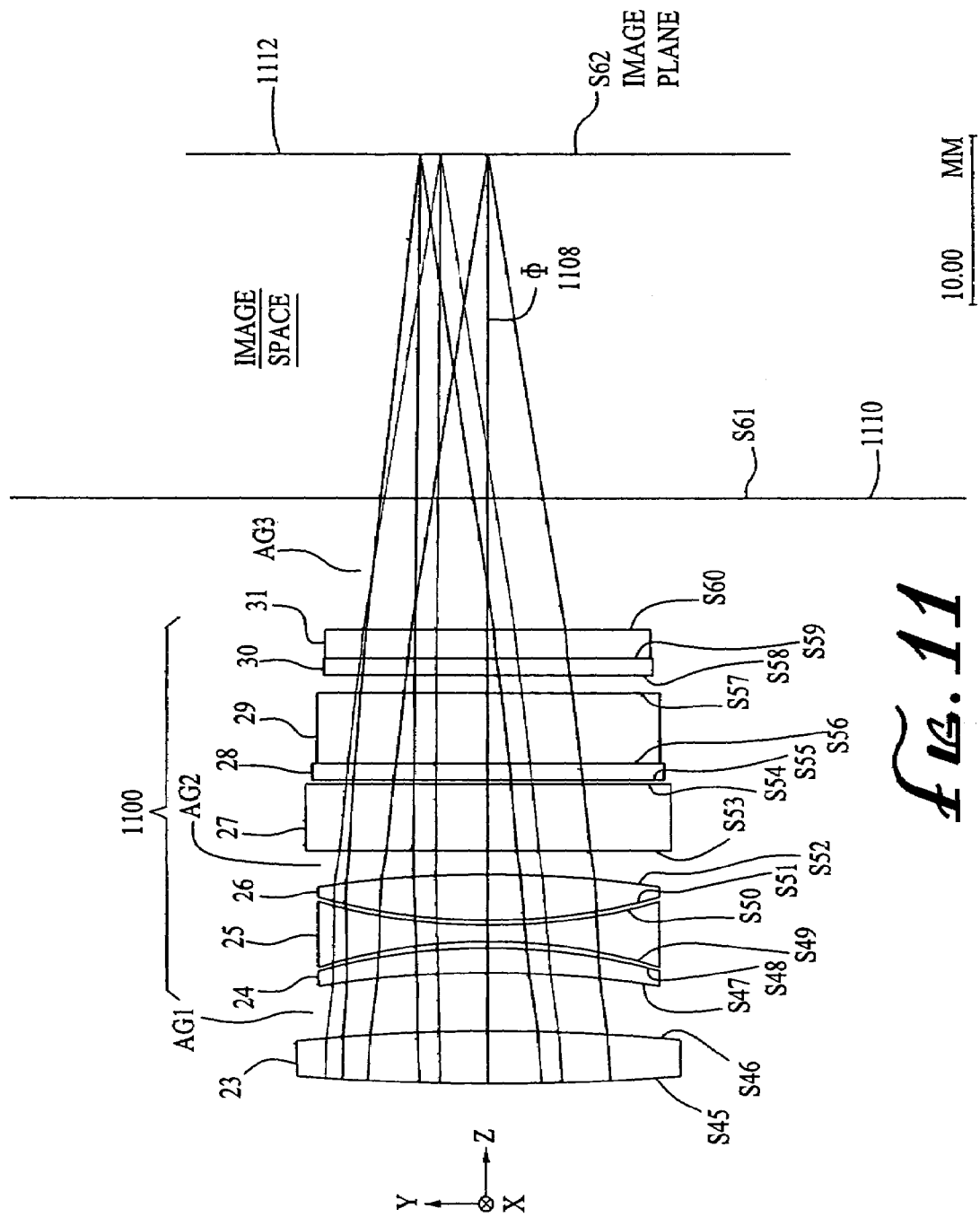
FIG. 11 is a side (elevation) view of a rear anamorph with eight lens elements that produce a vertical squeeze according to alternative embodiments of the present invention.

FIG. 11 is a side (elevation) view of a rear anamorph 1100 with eight lens elements (labeled 24 through 31 in FIG. 11) according to the alternative embodiment described above in which the three cylindrically-surfaced elements oriented in the vertical direction (elements 24–26) produce an image that is squeezed or compressed in the vertical direction. Note that element 23 is the last lens element of a lens unit attached to the rear anamorph 1100. The lens elements of the rear anamorph 1100 include surfaces S47 through S60. S62 is the surface of an image plane 1112, and the optical axis 1108 is identified by a Ø. An optional reflex mirror 1110 having a dummy surface S61 is located between the rear anamorph 1100 and the image plane 1112.

In the embodiment of FIG. 11, element 24 has positive power, element 25 is bi-concave, element 26 has positive power, element 27 has positive power, elements 28 and 29 are a doublet, and elements 30 and 31 are also a doublet. Note that for the doublet comprised of elements 28 and 29 and the doublet comprised of elements 30 and 31, the coincident facing lens surfaces are given single surface numbers S56 and S59, respectively. The actual radius of each lens surface is set forth in TABLE II below. The net result is that rear anamorph of FIG. 11 vertically squeezes a 4:3 image in object space onto a 16:9 image in image space. The captured image may then be horizontally squeezed using electronic processing techniques to reproduce the original 4:3 image. Therefore, this alternative embodiment is particularly useful when the conventional 4:3 television format is desired.

Figure 12:
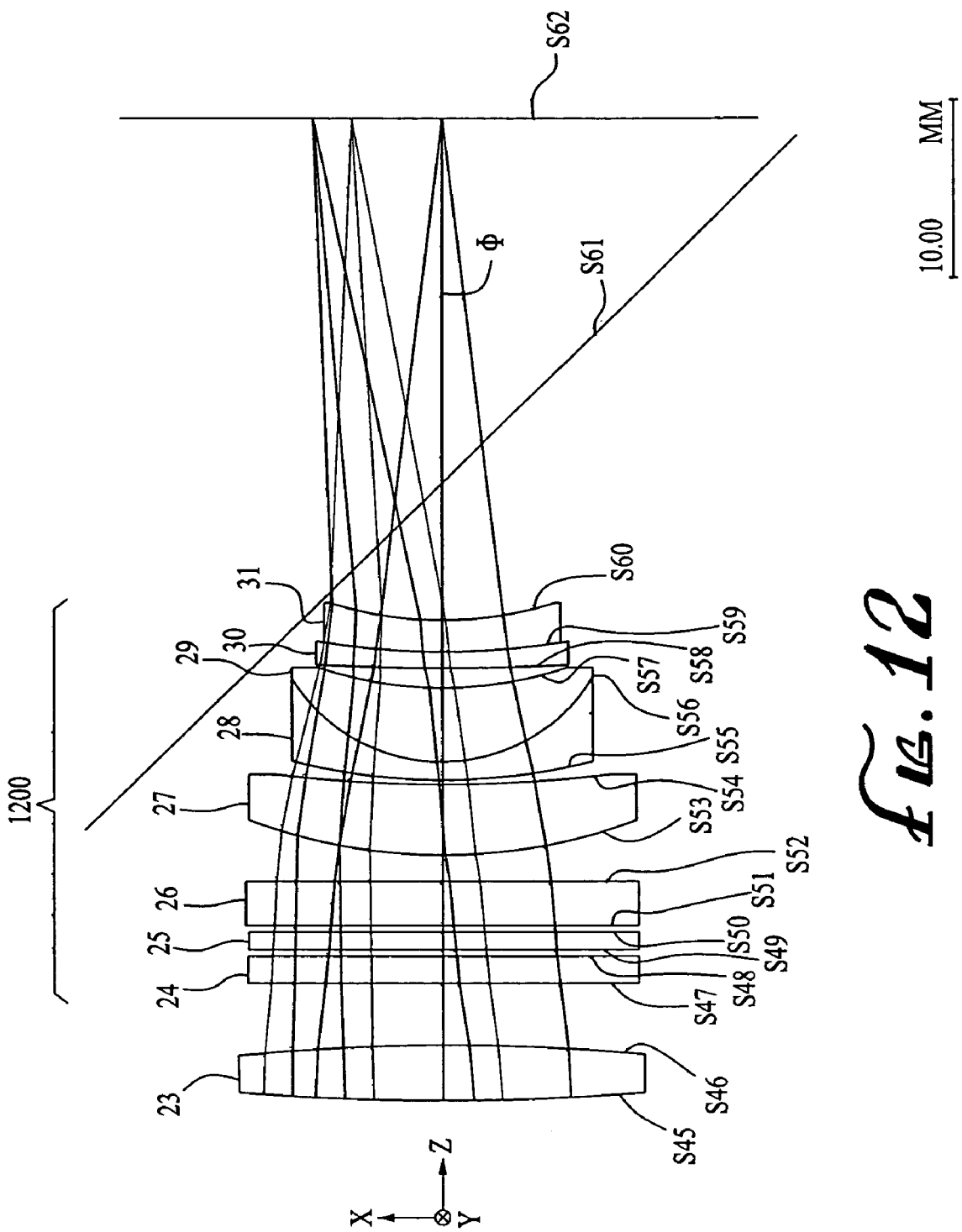
FIG. 12 is a top (plan) view of the rear anamorph with eight lens elements that produce a vertical squeeze according to alternative embodiments of the present invention.

FIG. 12 is a top (plan) view of the rear anamorph of FIG. 11 according to alternative embodiments of the present invention, identified in FIG. 12 by reference character 1200. Again, note that element 23 is the last lens element of the lens unit attached to the rear anamorph 1200. In FIG. 12, it is apparent from their curvatures that lens elements 27–31 are oriented in the horizontal (X) direction.

The lens construction and fabrication data for a lens system that includes the alternative rear anamorph of FIGS. 11 and 12 and the exemplary zoom lens of U.S. Pat. No. 6,122,111 is set forth in TABLE II below. Note that the lens construction and fabrication data of the exemplary zoom lens is identical to that shown in TABLE I, and the configuration of the exemplary zoom lens (positions F1 and Z1 in TABLE 2 of U.S. Pat. No. 6,122,111) is identical to that shown in FIGS. 5 and 6 and represented in the data of TABLE I, and therefore that data has not been repeated in TABLE II. Thus, TABLE II only includes data for the last element of the exemplary zoom lens (element 23) and the eight elements (elements 24–31) of the alternative embodiment rear anamorph of FIGS. 11 and 12.

TABLE II

OPTICAL PRESCRIPTION

| Item | Surface No. | Shape | Y Radius of Curvature (mm) | X Radius of Curvature (mm) | Thickness or Separation (mm) | Material Type | Material Code | Material Name | Maximum Aperture Heights in Directions Radial (mm) | Y (mm) | X (mm) |
|---|---|---|---|---|---|---|---|---|---|---|---|
| 23 | S45 | Sphere | 128.877 | 128.877 | 3.169 | Glass | 720460 | LAM61 | 10.18 | | |
|  | S46 | Sphere | −118.373 | −118.373 | 3.500 | Air | | | 10.15 | | |
| 24 | S47 | Y Cylinder | −65.373 | Flat | 1.541 | Glass | 816466 | SLAH59 | 9.80 | 9.00 | |
|  | S48 | Y Cylinder | −35.639 | Flat | 0.377 | Air | | | 9.83 | 9.00 | |
| 25 | S49 | Y Cylinder | −31.889 | Flat | 1.000 | Glass | 654397 | SNBH5 | 9.80 | 9.00 | |
|  | S50 | Y Cylinder | 37.298 | Flat | 0.257 | Air | | | 9.86 | 9.00 | |
| 26 | S51 | Y Cylinder | 37.952 | Flat | 2.641 | Glass | 816466 | SLAH59 | 9.90 | 9.00 | |
|  | S52 | Y Cylinder | −73.065 | Flat | 1.490 | Air | | | 9.90 | 9.00 | |
| 27 | S53 | X Cylinder | Flat | 31.175 | 4.005 | Glass | 835427 | SLAH55 | 9.71 | | |
|  | S54 | X Cylinder | Flat | 85.148 | 0.250 | Air | | | 9.39 | | |
| 28 | S55 | X Cylinder | Flat | 36.608 | 1.000 | Glass | 487702 | SFSL5 | 9.33 | | 7.50 |

TABLE II-continued

OPTICAL PRESCRIPTION

| Item | Surface No. | Surface Shape | Y Radius of Curvature (mm) | X Radius of Curvature (mm) | Thickness or Separation (mm) | Material Type | Material Code | Material Name | Maximum Aperture Heights in Directions Radial (mm) | Y (mm) | X (mm) |
|---|---|---|---|---|---|---|---|---|---|---|---|
| 29 | S56 | X Cylinder | Flat | 9.651 | 4.155 | Glass | 456903 | SFPL52 | 9.11 | | 7.50 |
|  | S57 | X Cylinder | Flat | 22.169 | 1.068 | Air |  |  | 8.76 | | 6.10 |
| 30 | S58 | X Cylinder | Flat | 93.890 | 1.000 | Glass | 439950 | SFPL53 | 8.68 | | 6.20 |
| 31 | S59 | X Cylinder | Flat | 43.519 | 1.724 | Glass | 750373 | SLAM7 | 8.59 | | 5.80 |
|  | S60 | X Cylinder | Flat | 20.977 | 7.810 | Air |  |  |  | 7.00 | 5.60 |
| Dummy Surface | S61 | Flat | Flat |  | 20.523 | Air |  |  |  | | |
| Image Plane | S62 | Flat | Flat |  | 0.000 | Air |  |  | 13.60 | | |

The last column of TABLE II headed "Maximum Aperture Heights in Directions" provides the maximum diameter for each surface through which the light rays pass, for a given direction. All of the maximum aperture diameters are given at a wavelength of 546.1 nanometers for a maximum radial image height of 8.16 mm and a constant f-number of f/3.66 at the Image Plane. Surface S60 has a maximum aperture height in Y of 7.00 mm and a maximum aperture height in X of 5.60 mm. Surface S60 has a rectangular aperture as compared to the circular apertures of most other surfaces.

An exemplary zoom lens system which includes the alternative embodiment rear anamorph of FIGS. 11 and 12 and the exemplary zoom lens of U.S. Pat. No. 6,122,111 at positions F1 and Z1 has a paraxial effective focal length of about 12.40 mm in the Y-direction and about 15.35 mm in the X-direction. The f-number for the exemplary lens system is about 3.15 in the Y-direction and about 4.11 in the X-direction, providing a theoretical effective combined f-number of about 3.66. Note that the exemplary zoom lens system should include an electronic detector with a 16:9 image capture area located at the final image plane.

FIG. 13 illustrates the diffraction modulation transfer function (MTF) for the rear anamorph according to alternative embodiments of the present invention for light rays entering the lens system with field positions that are 60% of the actual X and Y field heights in image space shown in FIG. 8. The diffraction MTF curves of FIG. 13 are polychromatic, with different wavelength weights. Note that at a spatial frequency of about 20 cycles/mm, at the extreme right distal end of the plots, the diffraction MTF for nine of the field fans are clustered with a modulation range of about 0.71–0.84, and the diffraction MTF for one of the field fans has a modulation of about 0.63. As noted above, in general, diffraction MTFs greater than 0.50 are desired. In addition, the full field distortion shown in column three of TABLE 2 of U.S. Pat. No. 6,122,111 is −4.5%, as compared to a low full field distortion of about 2% achievable using the alternative embodiment rear anamorph.

In further alternative embodiments of the present invention, the rear anamorph of FIGS. 11 and 12 may be rotated 90 degrees about the optical axis. In other words, the X and Y directions would essentially be swapped. In addition, the edges of the lens elements would need to be re-sized to account for the different space available in the X, Y and radial directions. The net result of this rotation is that the rear anamorph would horizontally squeeze a 2.40:1 image in object space onto a 16:9 image in image space. The captured image may then be vertically squeezed using electronic processing techniques to reproduce the original 2.40:1 image. Therefore, this alternative embodiment rear anamorph is particularly useful when the widescreen format is desired.

The optical prescription for this alternative embodiment rear anamorph is similar to the prescription given in TABLE II. However, the columns labeled "Y Radius of Curvature" and "X Radius of Curvature" would be swapped for elements 24–31. In addition, the columns labeled "Maximum Aperture Heights in Directions" for radial, Y and X directions would also be recalculated and changed from those listed in TABLE II to account for the different space available in the X, Y and radial directions. The performance of this alternative embodiment rear anamorph is substantially similar to the performance indicated in FIG. 13.

In still further alternative embodiments, a single rear anamorph lens design may be developed that can be oriented and operated in either the X or Y direction without any need to change the shape of the lens elements. In such an embodiment, depending on the orientation of the rear anamorph, the columns labeled "Maximum Aperture Heights in Directions" for radial, Y and X directions would be calculated for the case with the largest values.

It should also be noted that the rear anamorph of FIGS. 3 and 4 according to preferred embodiments of the present invention may also be rotated 90 degrees. In the orientation of FIGS. 3 and 4, the rear anamorph captures a 2.40:1 image in object space and stretches it vertically onto a 16:9 detector. The captured image may then be stretched horizontally using optical or digital processing techniques to produce the final 2.40:1 image. When the rear anamorph of FIGS. 3 and 4 is rotated 90 degrees, the rear anamorph captures a 4:3 image and stretches it horizontally onto a 16:9 detector. The captured image may then be stretched vertically using digital processing techniques to produce the final 4:3 image.

The rotatable alternative embodiment rear anamorph lens designs described above result from the fact that both the 4:3 standard television format and the 2.40:1 widescreen format are related to the 16:9 electronic detector aspect ratio by virtually the same factor. In other words, the 4:3 standard television aspect ratio of 1.33:1, when multiplied by the squeeze factor of about 1.34, yields approximately the 16:9 electronic detector aspect ratio of 1.78:1, and the 1.78:1 aspect ratio, when multiplied by about the squeeze factor, yields approximately the 2.40:1 widescreen aspect ratio. As a result, a single rotatable alternative embodiment rear anamorph described above may be used to capture 4:3 standard television images or 2.40:1 widescreen images on a 16:9 detector, simply by rotating the anamorph. In addition, a drop-in version of this rear anamorph may be utilized. With this option, the user has the ability to capture either 16:9 digital television (e.g. HDTV) images, 4:3 standard television images (with rear anamorph in a first orientation), or 2.40:1 widescreen images (with rear anamorph rotated 90 degrees from the first orientation), all on the same 16:9 detector.

In further alternative embodiments of the present invention, cylindrically surfaced elements may be aligned with 45 degree differences in their orientation to enable aberration control in even more directions. In such an embodiment, the final image may be viewed as being separated into four quadrants, the goal being to have nearly identical imaging characteristics in all four quadrants. In a rotationally symmetrical optical system, this is not a problem. However, in a cylindrical rear anamorph with elements oriented with only 45 degree differences, quadrants in opposite corners will have similar image characteristics, but they will be different from the other two quadrants. The image quality becomes asymmetrical. To avoid this, other elements must be oriented 90 degrees different from the elements oriented at 45 degrees (i.e. oriented at 135 degrees). In other words, a total of four directions are required; in addition to elements oriented along the x and y axes, elements must be aligned at 45 degrees with respect to the x axis, and also at 135 degrees with respect to the x axis. Alternatively, cylindrically surfaced elements could be oriented in other directions (e.g. at 10 degrees with respect to the horizontal), and corresponding elements added for symmetry may be oriented with a 90 degree offset (e.g. at 100 degrees). In still further alternatives, the corresponding elements may be oriented with offsets other than 90 degrees (e.g. −10 degrees) with a resulting loss of symmetry.

In further alternative embodiments of the present invention, hybrid surfaces such as toroids or aspherical toroids may be employed. Toroidal surfaces are compound surfaces that have the combined effect of a cylindrically surfaced element oriented in both the X and Y directions. Toroidal surfaces may reduce the number of lens elements required, which can be very beneficial in applications where a small size is needed such as cellular telephones and point-and-shoot cameras.

In further alternative embodiments of the present invention, a drop-in version of the rear anamorph could be designed for use with a high-end camcorder with a 16:9 aspect ratio electronic detector so that the camcorder could not only capture 16:9 images but also widescreen images. Conventional camcorders capable of capturing widescreen images on electronic detectors or film with a standard aspect ratio do so by simply ignoring the pixels at the top and bottom of the detector, and only utilizing the pixels in the center section of the detector that form a widescreen aspect ratio. Thus, data is actually lost while providing this widescreen format. In contrast, because the rear anamorph of the present invention is optical, more information is captured on the detector, and the captured image can then be stretched electronically to produce the widescreen image.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A rear anamorph formed by a plurality of lens elements aligned on a common optical axis, the rear anamorph for receiving radiation from an object space and delivering the radiation to an image space, the rear anamorph comprising:
   a first plurality of lens elements having a first anamorphic power and having optical surfaces aligned in a first direction about the optical axis; and
   a second plurality of lens elements having a second anamorphic power and having optical surfaces aligned in a second direction about the optical axis;
   wherein the second anamorphic power is different from the first anamorphic power and the second direction is different from the first direction to produce two different focal lengths so that the collected radiation is compressed or expanded at the image space.

2. The rear anamorph of claim 1, wherein all of the lens elements are cylindrically surfaced.

3. The rear anamorph of claim 1, wherein the collected radiation is compressed or expanded at the image space with a ratio lower than 2 to 1.

4. The rear anamorph of claim 3, wherein the collected radiation is compressed or expanded at the image space with a ratio of about 1.34 to 1.

5. The rear anamorph of claim 1, wherein the first direction is oriented at 90 degrees with respect to the second direction.

6. The rear anamorph of claim 1, wherein the first direction is a vertical direction and the second direction is a horizontal direction.

7. The rear anamorph of claim 1, wherein the first plurality of lens elements are primarily for compressing or expanding the image and the second plurality of lens elements are primarily for aberration control.

8. The rear anamorph of claim 1, wherein the first plurality of lens elements are adjacent to each other and located toward the object space and the second plurality of lens elements are adjacent to each other and located toward the image space.

9. The rear anamorph of claim 8, wherein the first plurality of lens elements and the second plurality of lens elements are configured such that the rear anamorph has an axial length of about 26 mm.

10. The rear anamorph of claim 8, wherein the first plurality of lens elements and the second plurality of lens elements are configured for short back focal length lenses such that the rear anamorph has an axial length of about 20 mm.

11. The rear anamorph of claim 8, further comprising an air gap between the first plurality of lens elements and the second plurality of lens elements;
   wherein the first plurality of lens elements are movable as a group along the optical axis and the second plurality of lens elements are movable as a group along the optical axis to align image planes formed from the two different focal lengths.

12. The rear anamorph of claim 1, wherein all of the lens elements are movable as a group along the optical axis to align the image formed by the rear anamorph with an image plane.

13. The rear anamorph of claim 1, wherein the rear anamorph is movable along the optical axis with respect to an image plane.

14. The rear anamorph of claim 8, wherein the first plurality of lens elements comprise three lens elements El, E2 and E3 listed in order from the object space towards the image space, and the second plurality of lens elements comprise five lens elements E4, E5, E6, E7 and E8 listed in order from the object space towards the image space.

15. The rear anamorph of claim 14, wherein lens elements E1–E4 are singlets, lens elements E5 and E6 form a doublet, and lens elements E7 and E8 form a doublet.

16. The rear anamorph of claim 15, wherein lens elements E1, E2 and E3 are oriented in a vertical direction and lens elements E4, E5, E6, E7 and E8 are oriented in a horizontal direction.

17. The rear anamorph of claim 15, wherein lens elements E1, E2 and E3 are oriented in a horizontal direction and lens elements E4, E5, E6, E7 and E8 are oriented in a vertical direction.

18. The rear anamorph of claim 15, further comprising an air gap between lens elements E3 and E4;
wherein lens elements E1, E2 and E3 are movable as a group along the optical axis and lens elements E4, E5, E6, E7 and E8 are movable as a group along the optical axis to align the image planes formed from the two different focal lengths.

19. The rear anamorph of claim 15, wherein all of the lens elements are movable as a group along the optical axis to align the image formed by the rear anamorph with an image plane.

20. A rear anamorph formed by a plurality of lens elements aligned on a common optical axis, the rear anamorph for receiving radiation from an object space and delivering the radiation to an image space, the rear anamorph comprising:
a first plurality of lens elements having a first anamorphic power and having optical surfaces aligned in a first direction about the optical axis, the first anamorphic power for providing aberration control and refraction to compress or expand the collected radiation at the image space; and
a second plurality of lens elements having a second anamorphic power and having
optical surfaces aligned in a second direction about the optical axis, the second anamorphic power for providing aberration control.

21. The rear anamorph of claim 20, wherein the first plurality of lens elements are movable as a group along the optical axis and the second plurality of lens elements are movable as a group along the optical axis to align image planes formed from the two different focal lengths.

22. The rear anamorph of claim 20, wherein all of the lens elements are movable as a group along the optical axis to align the image formed by the rear anamorph with an image plane.

23. The rear anamorph of claim 20, wherein the rear anamorph is movable along the optical axis with respect to an image plane.

24. A rear anamorph formed by a plurality of lens elements aligned on a common optical axis, the rear anamorph for receiving radiation from an object space and delivering the radiation to an image space, the rear anamorph comprising:
a first plurality of lens elements having a first anamorphic power and having optical surfaces aligned in a first direction about the optical axis; and
a second plurality of lens elements having a second anamorphic power and having optical surfaces aligned in a second direction about the optical axis;
wherein the second anamorphic power is different from the first anamorphic power and the second direction is different from the first direction to produce two different focal lengths so that radiation collected in object space with an aspect ratio of about 2.40:1 is captured on a 16:9 detector.

25. The rear anamorph of claim 24, wherein the rear anamorph is rotatable 90 degrees about the optical axis so that radiation collected in object space with an aspect ratio of about 4:3 is captured on the 16:9 detector.

26. A rear anamorph formed by a plurality of lens elements aligned on a common optical axis, the rear anamorph for receiving radiation from an object space and delivering the radiation to an image space, the rear anamorph comprising:
a first plurality of lens elements having a first anamorphic power and having optical surfaces aligned in a first direction about the optical axis; and
a second plurality of lens elements having a second anamorphic power and having optical surfaces aligned in a second direction about the optical axis;
wherein the second anamorphic power is different from the first anamorphic power and the second direction is different from the first direction to produce two different focal lengths so that radiation collected in object space with an aspect ratio of about 4:3 is captured on a 16:9 detector.

27. The rear anamorph of claim 26, wherein the rear anamorph is rotatable 90 degrees about the optical axis.

28. An anamorphic optical system formed by a plurality of lens elements aligned on a common optical axis, the anamorphic optical system for receiving radiation from an object space and delivering the radiation to an image space, the system comprising:
a lens unit for collecting the radiation from the object space;
a detector for receiving the radiation delivered from the object space at the image space; and
a rear anamorph coupled between the lens unit and the detector for receiving radiation from the lens unit and delivering it to the detector, the rear anamorph comprising
a first plurality of lens elements having a first anamorphic power and having optical surfaces aligned in a first direction about the optical axis, and
a second plurality of lens elements having a second anamorphic power and having optical surfaces aligned in a second direction about the optical axis;
wherein the second anamorphic power is different from the first anamorphic power and the second direction is different from the first direction to produce two different focal lengths so that the radiation received from the lens unit is compressed or expanded at the detector.

29. The system of claim 28, wherein all of the lens elements are cylindrically surfaced.

30. The system of claim 28, wherein the collected radiation is compressed or expanded at the image space with a ratio lower than 2 to 1.

31. The system of claim 30, wherein the collected radiation is compressed or expanded at the image space with a ratio of about 1.34 to 1.

32. The system of claim 28, wherein the first direction is a horizontal direction and the second direction is a vertical direction.

33. The rear anamorph of claim 28, wherein the first plurality of lens elements are primarily for compressing or expanding the image and the second plurality of lens elements are primarily for aberration control.

34. The system of claim 28, wherein the first plurality of lens elements are adjacent to each other and located toward the object space and the second plurality of lens elements are adjacent to each other and located toward the image space.

35. The system of claim 28, wherein the first plurality of lens elements and the second plurality of lens elements are configured such that the rear anamorph has an axial length of about 26 mm.

36. The system of claim 28, wherein the first plurality of lens elements and the second plurality of lens elements are configured for short back focal length lenses such that the rear anamorph has an axial length of about 20 mm.

37. The system of claim 34, further comprising an air gap between the first plurality of lens elements and the second plurality of lens elements;
wherein the first plurality of lens elements are movable as a group along the optical axis and the second plurality of lens elements are movable as a group along the optical axis to align image planes formed from the two different focal lengths.

38. The system of claim 34, wherein all of the lens elements are movable as a group along the optical axis to align the image formed by the rear anamorph with an image plane.

39. The system of claim 34, wherein the lens unit is movable along the optical axis with respect to the rear anamorph to align the image formed by the rear anamorph with an image plane.

40. The system of claim 34, further comprising a reflex mirror located between the lens element closest to an image plane and the image plane.

41. A camcorder including the system of claim 28.

42. A cellular telephone including the system of claim 28.

43. A point-and-shoot camera including the system of claim 28.

44. The system of claim 28, wherein the rear anamorph may be selectively rotated in a horizontal or vertical orientation about the optical axis.

45. The system of claim 28, wherein the rear anamorph is rotatable 90 degrees about the optical axis so that radiation collected in object space with an aspect ratio of about 2.40:1 or about 4:3 may be selectively captured on a 16:9 detector.

46. The system of claim 28, wherein the rear anamorph is selectively insertable into a light path passing through the system and selectively rotatable 90 degrees about the optical axis so that radiation collected in object space with an aspect ratio of about 2.40:1 or about 4:3 may be selectively captured on a 16:9 detector, and wherein the rear anamorph is selectively removable from the light path so that radiation collected in object space with an aspect ratio of about 16:9 may be selectively captured on the 16:9 detector.

47. A method for receiving radiation collected from object space by a lens system and compressing or expanding the radiation and delivering the radiation to an image space, the method comprising:
passing the collected radiation through a first plurality of lens elements aligned on a common optical axis having a first anamorphic power and having optical surfaces aligned in a first direction about the optical axis; and
passing the collected radiation through a second plurality of lens elements having a second anamorphic power and having optical surfaces aligned in a second direction about the optical axis;
wherein the second anamorphic power is different from the first anamorphic power and the second direction is different from the first direction to produce two different focal lengths so that the collected radiation is compressed or expanded at the image space.

48. The method of claim 47, wherein the collected radiation is compressed or expanded at the image space with a ratio of about 1.34 to 1.

49. The method of claim 47, wherein the first direction is a vertical direction and the second direction is a horizontal direction.

50. The method of claim 47, further comprising compressing or expanding the image with the first plurality of lens elements and performing aberration control with the second plurality of lens elements.

51. The method of claim 47, further comprising arranging the first plurality of lens elements adjacent to each other and located toward the object space and arranging the second plurality of lens elements adjacent to each other and located toward the image space.

52. The method of claim 51, further comprising moving the first plurality of lens elements as a group along the optical axis and moving the second plurality of lens elements as a group along the optical axis to adjust an air gap between the first plurality of lens elements and the second plurality of lens elements and align image planes formed from the two different focal lengths.

53. The method of claim 51, further comprising moving all of the lens elements as a group along the optical axis to align the image formed by the rear anamorph with an image plane.

54. The method of claim 51, further comprising moving the rear anamorph along the optical axis with respect to an image plane.

55. The method of claim 51, further comprising obtaining a final image by optically or electronically expanding or compressing the radiation collected at the image space.

* * * * *